US012296598B2

(12) United States Patent
Zhou

(10) Patent No.: US 12,296,598 B2
(45) Date of Patent: May 13, 2025

(54) CONSUMABLE CHIP, CONSUMABLE CARTRIDGE HAVING THE SAME, AND MANUFACTURING METHOD THEREOF

(71) Applicant: HANGZHOU CHIPJET TECHNOLOGY CO., LTD., Hangzhou (CN)

(72) Inventor: Yi Zhou, Hangzhou (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 170 days.

(21) Appl. No.: 18/098,715

(22) Filed: Jan. 19, 2023

(65) Prior Publication Data

US 2023/0150268 A1 May 18, 2023

Related U.S. Application Data

(63) Continuation of application No. PCT/CN2022/075041, filed on Jan. 29, 2022.

(30) Foreign Application Priority Data

Jul. 19, 2021 (CN) ......................... 202121642369.4

(51) Int. Cl.
*B41J 2/175* (2006.01)

(52) U.S. Cl.
CPC ......... *B41J 2/1753* (2013.01); *B41J 2/17546* (2013.01)

(58) Field of Classification Search
CPC ....... B41J 2/1753; B41J 2/17546; B41J 2/175
(Continued)

(56) References Cited

U.S. PATENT DOCUMENTS 11,161,347 B2 11/2021 Westermeyer
2003/0186613 A1* 10/2003 Kawase ............... H10K 71/135 445/24
(Continued)

FOREIGN PATENT DOCUMENTS

CN 203282858 U 11/2013
CN 103753962 A 4/2014
(Continued)

OTHER PUBLICATIONS

International Search Report of PCT/CN2022/075041.
Notice of Reasons for Refusal of JP2022581634.
Third Party Observation For Application No. EP22844821.3.

*Primary Examiner* — Jason S Uhlenhake
*Assistant Examiner* — Alexander D Shenderov

(57) ABSTRACT

A consumable chip, a consumable cartridge having the same, and a manufacturing method thereof are provided. The consumable chip includes a memory, a substrate, at least one low voltage terminal electrically connected to the memory, at least one high voltage terminal, and at least one detecting terminal. The at least one low voltage terminal, the at least one high voltage terminal, and the at least one detecting terminal are disposed on the substrate, and the at least one high voltage terminal and the at least one detecting terminal are separated from each other. The consumable chip further includes a conductive structure, an end of the conductive structure is electrically connected to the at least one low voltage terminal, and another end of the conductive structure extends between the at least one high voltage terminal and the at least one detecting terminal.

15 Claims, 12 Drawing Sheets

(58) Field of Classification Search
USPC .......................................................... 347/86
See application file for complete search history.

(56) References Cited

U.S. PATENT DOCUMENTS

| | | | | |
|---|---|---|---|---|
| 2019/0070859 | A1* | 3/2019 | Wang ...................... | H02H 7/20 |
| 2020/0361212 | A1* | 11/2020 | Westermeyer ......... | B41J 2/1755 |

FOREIGN PATENT DOCUMENTS

| | | | |
|---|---|---|---|
| CN | 203932999 | U | 11/2014 |
| CN | 206348600 | U | 7/2017 |
| CN | 111890801 | A | 11/2020 |
| CN | 211892486 | U | 11/2020 |
| CN | 212796256 | U | 3/2021 |
| EP | 3187338 | A1 | 7/2017 |
| EP | 3444118 | A1 | 2/2019 |
| EP | 3666527 | A1 | 6/2020 |
| JP | 2007196664 | A | 8/2007 |
| JP | 2012061707 | A | 3/2012 |
| JP | 5541030 | | 7/2014 |
| JP | 5541030 | B2 | 7/2014 |
| JP | 2015024544 | A | 2/2015 |

* cited by examiner

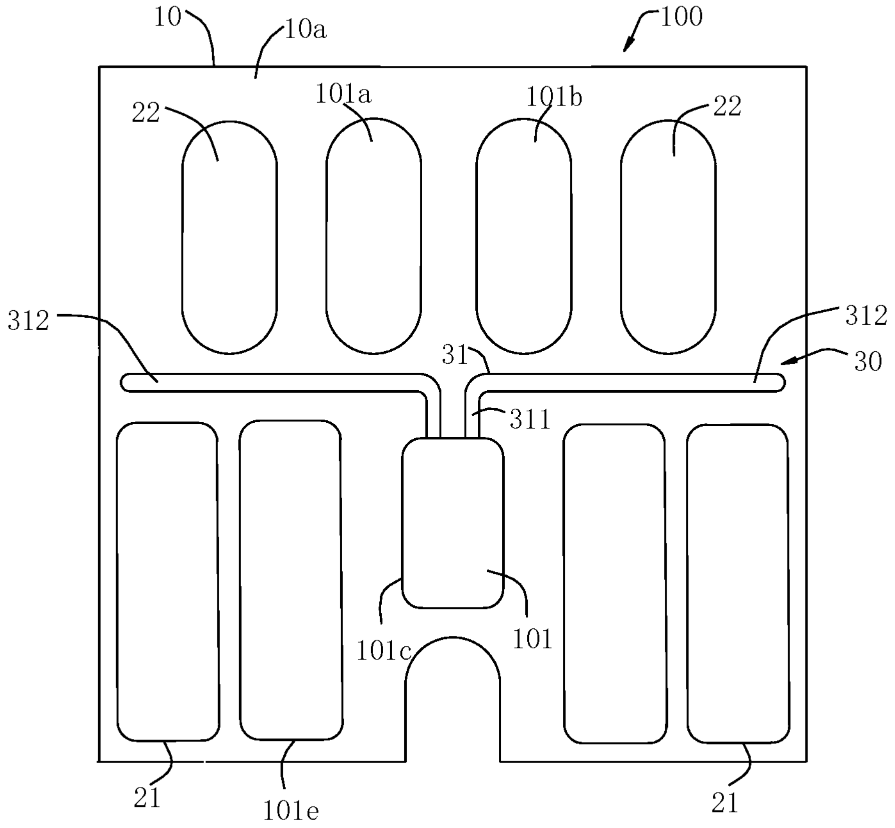

FIG. 21

Disposing a memory 104, at least one low voltage terminal 100a electrically connected to the memory 104, at least one high voltage terminal 21, and at least one detecting terminal 22 on a substrate 10, and the at least one high voltage terminal 21 and the at least one detecting terminal 22 being separated from each other

↓

Disposing a conductive structure 3 on the substrate 10, an end of the conductive structure 3 being electrically connected to the at least one low voltage terminal 100a, and extending another end of the conductive structure 3 between the at least one high voltage terminal 21 and the at least one detecting terminal 22

FIG. 22

CONSUMABLE CHIP, CONSUMABLE CARTRIDGE HAVING THE SAME, AND MANUFACTURING METHOD THEREOF

CROSS-REFERENCE TO RELATED APPLICATIONS

This application is a continuation of international patent application No. PCT/CN2022/075041, filed on Jan. 29, 2022, which itself claims priority to Chinese patent application No. 202121642369.4, filed on Jul. 19, 2021, titled "CONSUMABLE CHIP, CONSUMABLE CARTRIDGE HAVING THE SAME, AND MANUFACTURING METHOD THEREOF" in the China National Intellectual Property Administration. The contents of the above identified applications are hereby incorporated herein in their entireties by reference.

TECHNICAL FIELD

The present disclosure relates to the field of a printing device, and in particular, to a consumable chip, a consumable cartridge having the same, and a manufacturing method thereof.

BACKGROUND

A printing device typically uses a consumable cartridge, the consumable cartridge can include an ink cartridge with an ink cartridge chip mounted in the ink cartridge. The ink cartridge chip may store brand information, ink type information, ink color information, ink dosage information, etc. When mounted in the printing device, the ink cartridge must be verified before the ink cartridge can be used. Therefore, the ink cartridge chip plays a crucial role in verifying whether the ink cartridge can be used by the printing device.

In order to connect with the ink cartridge chip, the printing device includes a plurality of contact pins to contact a plurality of terminals of the ink cartridge. Currently, the contact pins of the printing device include high voltage contact pins and detecting contact pins, terminals of the ink cartridge chip include high voltage terminals, detecting terminals, and signal transmission terminals, and the signal transmission terminals include a plurality of conductive terminals, such as power terminals, ground terminals, and data terminals. In order to verify whether the ink cartridge is mounted in place, contact between the high voltage terminals and the high voltage contact pins, and contact between the detecting contact pins and the detecting terminals are verified to detect mounting by the printing device. When the printing device determines there is good contact between the high voltage terminals and the high voltage contact pins, and contact between the detecting contact pins and the detecting terminals, then the signal transmission terminals of the cartridge chip and the contact pins of the printing device are also in good contact.

However, a short circuit on the ink cartridge chip between the high voltage terminals and the detecting terminals adjacent thereto may be caused by ink dripping or deformation of the contact pins, causing damage to the ink cartridge chip and the printing device, unnecessary economic loss, and time loss.

One solution is providing a short circuit detecting circuit at the printing device. A voltage change condition of the contact pins of the printing device is detected by the short circuit detecting circuit, so as to determine whether the short circuit has occurred between the terminals on the ink cartridge chip. However, the solution of providing a short circuit detecting circuit is performed after the ink cartridge chip is mounted to the printing device. Although the short circuit on the ink cartridge chip is detected, memory elements on the ink cartridge chip may have been short-circuited and damaged. In addition, a printing device which does not have a short circuit detecting circuit poses potential safety hazards.

In the related art, a solution includes providing a short circuit detecting mechanism in the ink cartridge chip. Although detection of the short circuit on the ink cartridge chip can be independently completed by the solution, a detecting terminal and a corresponding hardware circuit need to be additionally arranged on a substrate of the ink cartridge chip, which has a high cost and high complexity. Furthermore, potential interference may be caused on normal communication between the ink cartridge chip and the printing device.

SUMMARY

For the issue of the above, it is necessary to provide a consumable chip, a consumable cartridge having the same, and a manufacturing method thereof. The consumable chip is simple in structure and low in cost, and can independently perform a short-circuit exception processing.

To achieve the above purposes, technical solutions provided by the present disclosure is as follows:

A consumable chip includes a memory, a substrate, at least one low voltage terminal electrically connected to the memory, at least one high voltage terminal, and at least one detecting terminal. The at least one low voltage terminal, the at least one high voltage terminal, and the at least one detecting terminal are disposed on the substrate, and the at least one high voltage terminal and the at least one detecting terminal are separated from each other. The consumable chip further includes a conductive structure, an end of the conductive structure is electrically connected to the at least one low voltage terminal, and another end of the conductive structure extends between the at least one high voltage terminal and the at least one detecting terminal.

It is understood that, the conductive structure is provided in the present disclosure, and another end of the conductive structure away from the at least one low voltage terminal extends between the at least one high voltage terminal and the at least one detecting terminal. In this way, when a short circuit occurs between the high voltage terminal and the detecting terminal due to ink dripping, a high voltage of the high voltage terminal will be conducted to the corresponding low voltage terminal via the conductive structure, so as to divide and depressurize the high voltage via the low voltage terminal, and prevent the high voltage of the high voltage terminal from being applied to the detecting terminal. That is, the detecting terminal cannot receive high voltage signals, so as to detect the short circuit, prevent the short circuit from occurring, and prevent the consumable chip and the printing device from being burned and damaged due to the high voltage.

In some embodiments, the consumable chip includes two sets of the high voltage terminal and the detecting terminal, the two sets are separated from each other. The at least one low voltage terminal is connected to at least one conductive structure, an end of the at least one conductive structure is electrically connected to the at least one low voltage terminal, and another end of the at least one conductive structure extends between the high voltage terminal and the detecting terminal in at least one same set.

In some embodiments, at least two conductive structures are disposed between the high voltage terminal and the detecting terminal in each same set. In some embodiments, one conductive structure is disposed between the high voltage terminal and the detecting terminal in one set, and at least two conductive structures are disposed between the high voltage terminal and the detecting terminal in the other set.

In some embodiments, the conductive structure includes a metal wire.

In some embodiments, the conductive structure is in a shape of T or L.

In some embodiments, the substrate includes at least one of the following structures:

the substrate is provided with a first groove at a first side wall, and a first conductive layer is disposed in the first groove and defined as the at least one low voltage terminal;

the substrate is provided with a second groove at a second side wall, and a second conductive layer is disposed in the second groove and defined as the at least one high voltage terminal; or the substrate is provided with a third groove and a fourth groove at a third side wall, the fourth groove is along a length direction of the substrate, the third groove is disposed on a side wall of the fourth groove, and a third conductive layer is disposed in the third groove and defined as the at least one detecting terminal.

In some embodiments, the second groove is a right-angle groove which has a long side wall and a short side wall, and the second conductive layer is disposed on the long side wall and defined as the at least one high voltage terminal.

In some embodiments, the conductive structure includes a connecting section and a barrier section, an end of the connecting section is electrically connected to the at least one low voltage terminal, another end of the connecting section is electrically connected to the barrier section, and the barrier section extends between the at least one high voltage terminal and the at least one detecting terminal.

Technical solutions provided by the present disclosure further includes: a consumable cartridge, including a consumable cartridge body and the consumable chip mentioned above, and the consumable chip is disposed on the consumable cartridge body; and a manufacturing method of a consumable chip for manufacturing the above consumable chip.

Compared with the related art, the conductive structure is provided on the consumable chip, and another end of the conductive structure away from the at least one low voltage terminal extends between the at least one high voltage terminal and the at least one detecting terminal. In this way, when the short circuit occurs between the high voltage terminal and the detecting terminal due to the ink dripping, a high voltage of the high voltage terminal will be conducted to the corresponding low voltage terminal via the conductive structure, so as to divide and depressurize the high voltage via the low voltage terminal, and prevent the high voltage of the high voltage terminal from being applied to the detecting terminal. That is, the detecting terminal cannot receive high voltage signals, so as to detect the short circuit, prevent the short circuit from occurring, and prevent the consumable chip and the printing device from being burned and damaged due to the high voltage.

BRIEF DESCRIPTION OF THE DRAWINGS

FIG. 21 is a second schematic view of a consumable chip in the twelfth embodiment of the present disclosure.

FIG. 22 is a flowchart view of a manufacturing method of a consumable chip in an embodiment of the present disclosure.

In the figures, 100 represents a consumable chip, 10 represents a substrate, **10*a* represents a first surface, 11 represents a first groove, 12 represents a second groove, 13 represents a third groove, 14 represents a fourth groove, 100*a* represents a low voltage terminal, 101 represents a first low voltage terminal, 101*a* represents an enable terminal, 101*b* represents a clock terminal, 101*c* represents a ground terminal, 101*d* represents a data terminal, 101*e* represents a power terminal, 102 represents a second low voltage terminal, 103 represents a third low voltage terminal, 104 represents a memory, 105 represents a fourth low voltage terminal, 21 represents a high voltage terminal, 22 represents a detecting terminal, 3 represents a conductive structure, 30 represents a conductive lead, 301 represents a connecting section, 302 represents a barrier section, 303 represents a first connecting section, 304 represents a first barrier section, 305 represents a second connecting section, 306 represents a second barrier section, 31 represents a first conductive lead, 311 represents a third connecting section, 312 represents a third barrier section, 32 represents a second conductive lead, 321 represents a fourth connecting section, 322 represents a fourth barrier section, 33 represents a third conductive lead, 34 represents a fourth conductive lead, 200 represents a consumable cartridge, and 210** represents a consumable cartridge body.

DETAILED DESCRIPTION

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all the embodiments. Based on the embodiments of the present disclosure, all other embodiments obtained by one skilled in the art without creative efforts all belong to the scope of protection of the present disclosure.

It should be noted that when a component is referred to as being "mounted on" another component, it may be directly mounted on the other component or an intervening component may be presented. When a component is referred to as being "disposed on" another component, it may be directly disposed on the other component or an intervening component may be presented. When a component is referred to as being "fixed to" another component, it may be directly fixed to the other component or an intervening component may be presented.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Figure 23:
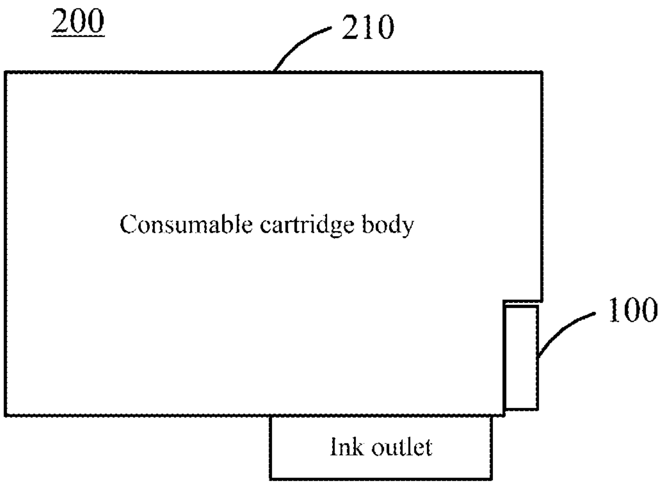
FIG. 23 is a schematic view of a consumable cartridge in an embodiment of the present disclosure.

Referring to FIG. 1 to FIG. 9, the present disclosure provides a consumable chip 100, the consumable chip 100 can be mounted on a consumable cartridge 200 and configured for burning/recording information of the consumable cartridge 200 and realizing a connection between the consumable cartridge 200 and a printing device. Referring to FIG. 23, the consumable cartridge 200 can include a consumable cartridge body 210 and the consumable chip 100, and the consumable chip 100 can be disposed on the consumable cartridge body 210.

The consumable chip 100 includes a memory 104, a substrate 10, at least one low voltage terminal 100*a* electrically connected to the memory 104, at least one high voltage terminal 21, and at least one detecting terminal 22. The at least one low voltage terminal 100*a*, the at least one high voltage terminal 21, and the at least one detecting terminal 22 are disposed on the substrate 10, and the at least one high voltage terminal 21 and the at least one detecting terminal 22 are separated from each other. The consumable chip 100 further includes a conductive structure 3, an end of the conductive structure 3 is electrically connected to the at least one low voltage terminal, and another end of the conductive structure 3 extends between the at least one high voltage terminal 21 and the at least one detecting terminal 22.

The conductive structure 3 is provided in the present disclosure, and another end of the conductive structure 3 away from the at least one low voltage terminal 100*a* extends between the at least one high voltage terminal 21 and the at least one detecting terminal 22. In this way, when a short circuit occurs between the high voltage terminal 21 and the detecting terminal 22 due to ink dripping, a high voltage of the high voltage terminal 21 will be conducted to the corresponding low voltage terminal 100*a* via the conductive structure 3, so as to divide and depressurize the high voltage via the low voltage terminal 100*a*, and prevent the high voltage of the high voltage terminal 21 from being applied to the detecting terminal 22. That is, the detecting terminal 22 cannot receive high voltage signals, so as to detect the short circuit, prevent the short circuit from occurring, and prevent the consumable chip and the printing device from being burned and damaged due to the high voltage.

Furthermore, the consumable chip 100 can include two sets of the high voltage terminal 21 and the detecting terminal 22, and the two sets are separated from each other. The at least one low voltage terminal 100*a* can be connected to at least one conductive structure 3, an end of the at least one conductive structure 3 can be electrically connected to the at least one low voltage terminal 100*a*, and another end of the at least one conductive structure 3 can extend between the high voltage terminal 21 and the detecting terminal 22 in at least one same set.

It should be noted that one low voltage terminal 100*a* can be connected to a plurality of conductive structure 3, and one conductive structure 3 can be connected to a plurality of low voltage terminals. Another end of conductive structure 3 can extend between the high voltage terminal 21 and detecting terminal 22 in one same set, and can also extend between the high voltage terminal 21 and the detecting terminal 22 in the two sets, respectively.

In some embodiments, the conductive structure 3 can include a connecting section 301 and a barrier section 302, an end of the connecting section 301 can be electrically connected to the at least one low voltage terminal 100*a*, another end of the connecting section 301 can be electrically connected to the barrier section 302, and the barrier section 302 can extend between the at least one high voltage terminal 21 and the at least one detecting terminal 22.

It should be noted that the barrier section 302 can extend between the high voltage terminal 21 and the detecting terminal 22 in any set, and can also extend between the high voltage terminal 21 and the detecting terminal 22 in the two sets, respectively.

Figure 1:
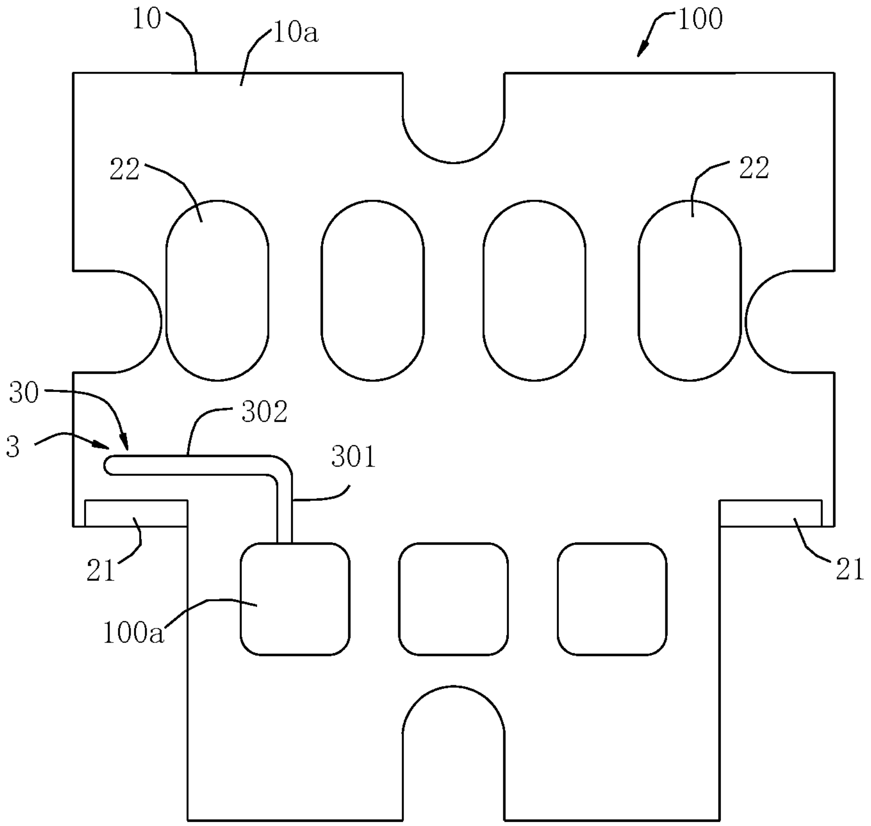
FIG. 1 is a first schematic view of a consumable chip in an embodiment of the present disclosure.
Figure 2:
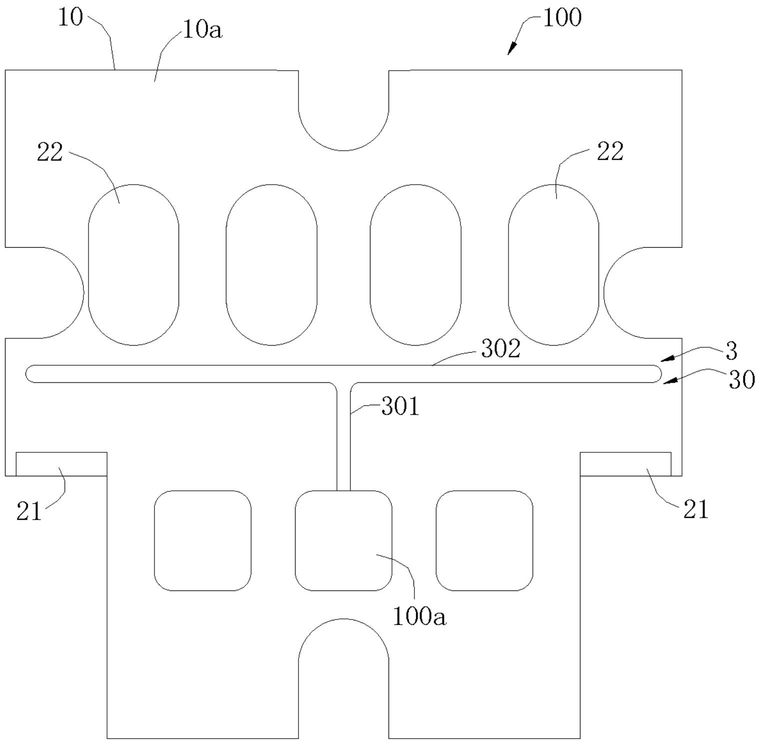
FIG. 2 is a second schematic view of a consumable chip in an embodiment of the present disclosure.

Furthermore, referring to FIG. 2, the consumable chip can include two sets of the high voltage terminal 21 and the detecting terminal 22, and the two sets thereof can be separated from each other on the substrate 10.

The conductive structure 3 can include a conductive lead 30, the conductive lead 30 can include the connecting section 301 and the barrier section 302, an end of the connecting section 301 can be electrically connected to the at least one low voltage terminal 100*a*, and another end of the connecting section 301 can be connected to the barrier section 302. Both ends of the barrier section 302 can correspond to one set of the high voltage terminal 21 and the detecting terminal 22, respectively, and extend between the high voltage terminal 21 and the detecting terminal 22 in one corresponding set, respectively.

In the present embodiment, locations between the high voltage terminal 21 and the detecting terminal 22 in the two sets can be connected to the same low voltage terminal 100*a* by the barrier section 302 and the connecting section 301 of the conductive lead 30.

Figure 3:
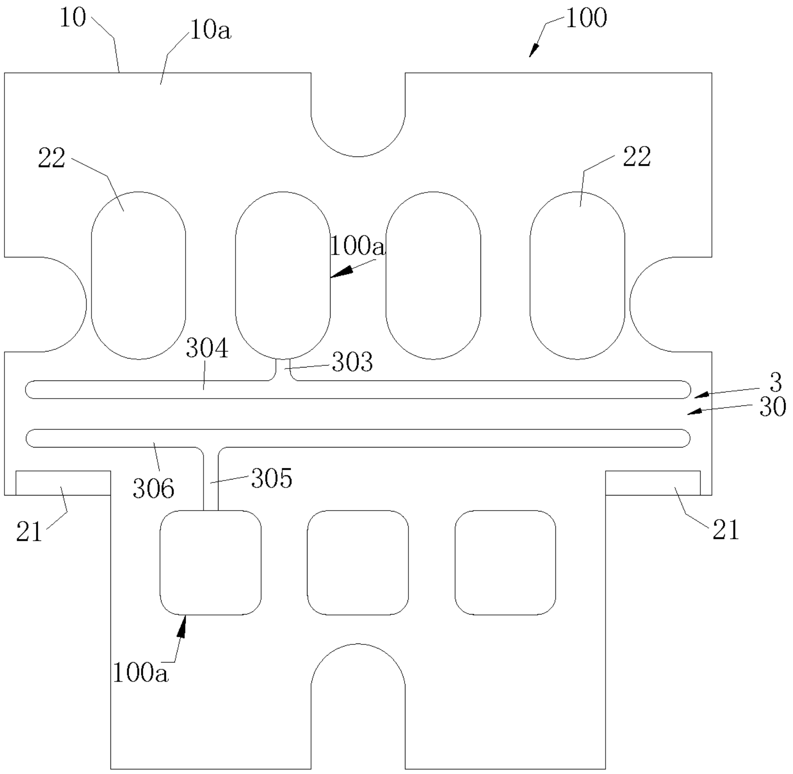
FIG. 3 is a third schematic view of a consumable chip in an embodiment of the present disclosure.

Furthermore, referring to FIG. 3, the consumable chip can include two sets of the high voltage terminal 21 and the detecting terminal 22, and the two sets thereof can be separated from each other on the substrate 10.

The conductive structure 3 can include a plurality of conductive leads 30, an end of at least one conductive lead 30 can be electrically connected to the at least one low voltage terminal 100*a*, and another end of the corresponding conductive lead 30 can extend between the high voltage terminal 21 and the detecting terminal 22 in one set. An end of at least one conductive lead 30 can be electrically connected to the at least one low voltage terminal 100*a*, and another end of the corresponding conductive lead 30 can extend between the high voltage terminal 21 and the detecting terminal 22 in another set.

In the present embodiment, the conductive structure can include a plurality of conductive leads 30, at least one conductive lead 30 can be disposed between the high voltage terminal 21 and the detecting terminal 22 in any set, the at least one conductive lead 30 can be connected to the at least one low voltage terminal 100*a*, and the plurality of conductive leads 30 between the high voltage terminal 21 and the detecting terminal 22 in the two sets can be connected to the same low voltage terminal 100*a* or different low voltage terminals 100*a*.

In some embodiments, at least two conductive structures 3 can be disposed between the high voltage terminal 21 and the detecting terminal 22 in each same set. In some embodiments, one conductive structure 3 can be disposed between the high voltage terminal 21 and the detecting terminal 22 in one set, and at least two conductive structures 3 can be disposed between the high voltage terminal 21 and the detecting terminal 22 in the other set.

Furthermore, referring to FIG. 3, a conductive lead 30 can include a first connecting section 303 and a first barrier section 304, and the end of this conductive lead 30 can extend between the high voltage terminal 21 and the detecting terminal 22 in one set. An end of the first connecting section 303 can be electrically connected to at least one low voltage terminal 100*a*, and another end of the first connecting section 303 can be connected to the first barrier section 304. Both ends of the first barrier section 304 can correspond to the two sets, respectively, and extend between the high voltage terminal 21 and the detecting terminal 22 in one corresponding set, respectively.

In some embodiments, a conductive lead 30 can include a second connecting section 305 and a second barrier section 306, and the end of this conductive lead 30 can extend between the high voltage terminal 21 and the detecting terminal 22 in the other set. An end of the second connecting section 305 can be electrically connected to at least one low voltage terminal 100*a*, and another end of the second connecting section 305 can be connected to the second barrier section 306. Both ends of the second barrier section 306 can correspond to the two sets, respectively, and extend between the high voltage terminal 21 and the detecting terminal 22 in one corresponding set, respectively.

In the present embodiment, any one of the conductive leads 30 can extend between the high voltage terminal 21 and the detecting terminal 22 in the two sets at the same time.

Figure 4:
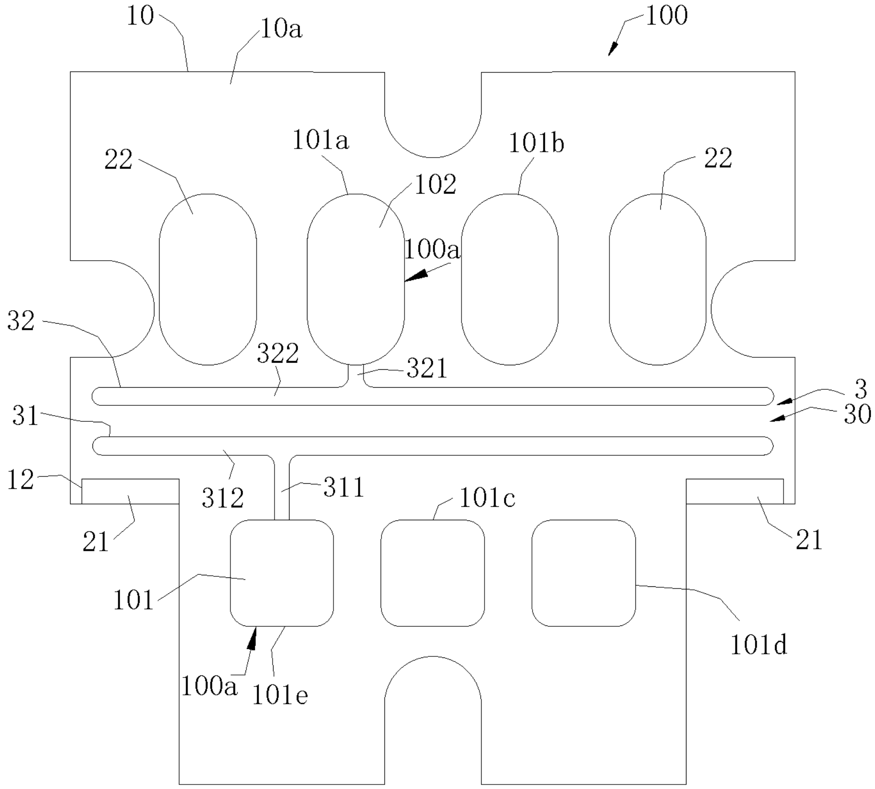
FIG. 4 is a first schematic view of a consumable chip in a first embodiment of the present disclosure.

Specifically, referring to FIG. 4, the low voltage terminal 100*a* can include a first low voltage terminal 101 and a second low voltage terminal 102 separated from each other, and the conductive structure 3 can include a first conductive lead 31 and a second conductive lead 32. An end of the first conductive lead 31 can be electrically connected to the first low voltage terminal 101, and another end of the first conductive lead 31 can extend between the high voltage terminal 21 and the detecting terminal 22. An end of the second conductive lead 32 can be electrically connected to the second low voltage terminal 102, and another end of the second conductive lead 32 can extend between the high voltage terminal 21 and the detecting terminal 22 corresponding to the first conductive lead 31.

Figure 5:
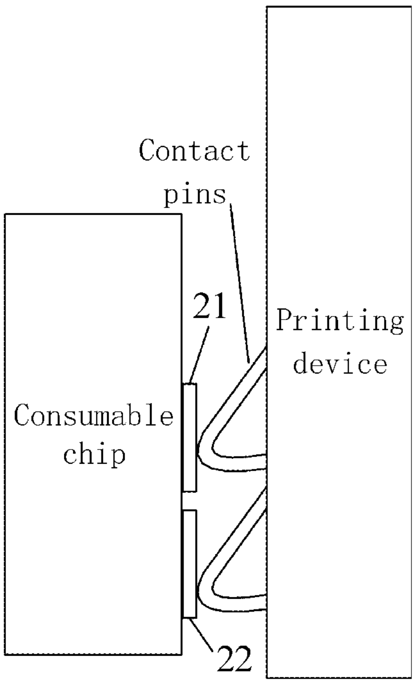
FIG. 5 is a schematic view of contact of terminals of a consumable chip and contact pins of a printing device in an embodiment of the present disclosure.

When the consumable cartridge 200 is mounted on the printing device (as shown in FIG. 5), a mounting detection section in the printing device will apply a high voltage (about 40 V) to the high voltage terminal 21. Voltage or current transmitted to an output of the mounting detection section can be detected to test whether the high voltage terminal 21 is in electrical contact with corresponding contact pins on the printing device, so as to determine whether the consumable cartridge 200 is correctly mounted on the printing device.

It should be noted that in the related art, since the fact that conductive substances such as the ink dripping can be sputtered onto the substrate 10 and cover the high voltage terminal 21 and the detecting terminal 22, the high voltage terminal 21 can be in communication with the detecting terminal 22 and the short circuit would occur, causing damage to the consumable chip 100 and/or the printing device. After the printing device and the consumable chip 100 are in communication with each other, the printing device can detect states of the consumable chip 100 by an internal circuit, for example, a mounting state and an ink quantity state. The printing device can input a voltage of about 40 V to one high voltage terminal 21 and output a voltage via another high voltage terminal 21, and the voltage output from another high voltage terminal 21 can be greater than 3.2 V and less than 40 V. At the same time, the printing device can input a voltage not greater than 3.2 V or not greater than 5 V to one of two detecting terminals 22, and output a voltage not greater than 3.2 V or not greater than 5 V via another of the two detecting terminals 22. Therefore, the voltages received by two high voltage terminals 21 can be greater than those received by the two detecting terminals 22. Since the fact that voltage difference between the high voltage terminals 21 and the detecting terminals 22 is great, when the high voltage is wrongly applied to the detecting terminals 22 with low voltage due to the short circuit between the high voltage terminals 21 and the detecting terminals 22, the consumable chip 100 can be damaged before a short-circuit protection function is triggered by the detecting terminal 22.

Therefore, in order to solve the problems mentioned above, the first conductive lead 31 and the second conductive lead 32 are provided in the consumable chip 100 of the present disclosure. An end of the first conductive lead 31 away from the first low voltage terminal 101 can extend between the high voltage terminal 21 and the detecting terminal 22, and an end of the second conductive lead 32 away from the second low voltage terminal 102 can extend between the high voltage terminal 21 and the detecting terminal 22. Therefore, when the short circuit occurs between the high voltage terminal 21 and the detecting terminal 22 due to conductive substances such as the ink dripping, a high voltage of the high voltage terminal 21 will be conducted to the first low voltage terminal 101 and the second low voltage terminal 102 via the first conductive lead 31 and the second conductive lead 32, respectively, so as to divide and depressurize the high voltage via the first low voltage terminal 101 and the second low voltage terminal 102, and prevent the high voltage of the high voltage terminal 21 from being applied to the detecting terminal 22. That is, the detecting terminal 22 cannot receive high voltage signals, so as to detect the short circuit, prevent the short circuit from occurring, and prevent the consumable chip 100 and the printing device from being burned and damaged due to the high voltage.

Figure 6:
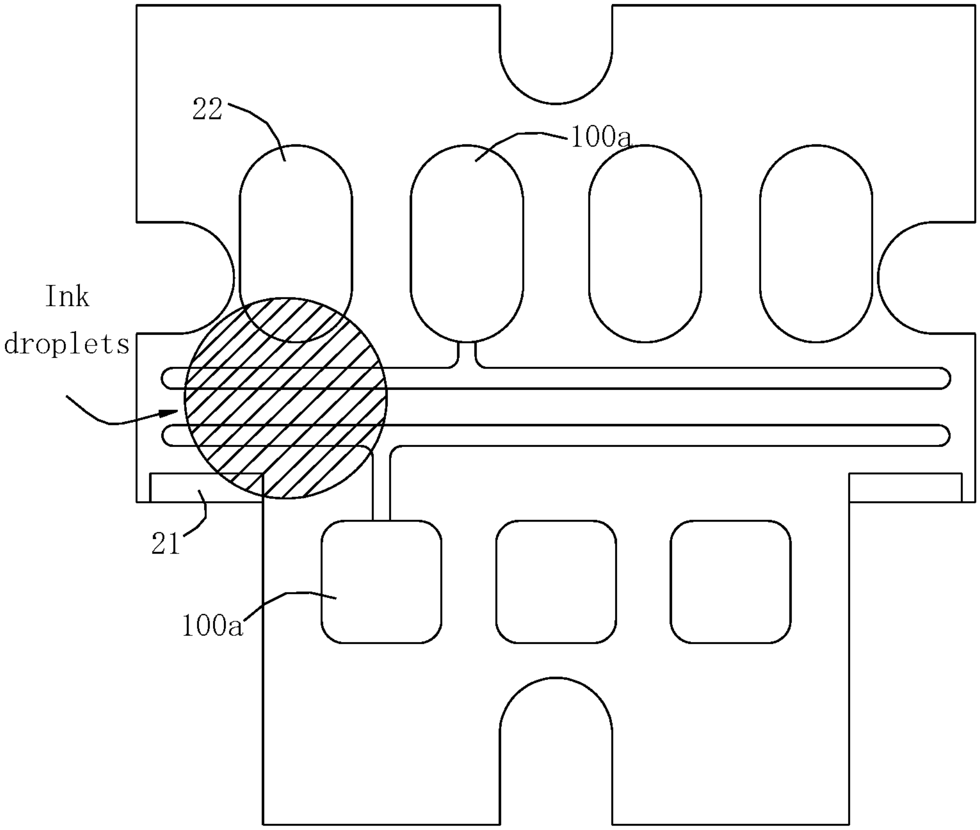
FIG. 6 is a schematic view of a consumable chip stained with an ink droplet in an embodiment of the present disclosure.

The specific principle is as follows. Referring to FIG. 6, when the short circuit occurs between the high voltage terminal 21 and the detecting terminal 22 due to the ink dripping, the ink dripping can extend and cover the conductive lead between the high voltage terminal 21 and the detecting terminal 22, thereby causing the low voltage terminal 100*a* connected to the conductive lead triggers a short-circuit protection function before the detecting terminal 22.

After the high voltage is conducted to the low voltage terminal 100*a* via the conductive lead, the ink cartridge chip will trigger the printing device to prompt an error such as "request for power off" or "ink cartridge mounting abnormal". Therefore, the printing device is unable to print, and the ink cartridge can be prompted to check or replace.

Specifically, when the short circuit occurs between a high-voltage input terminal and an enable terminal, voltages of the high-voltage input terminal and a high-voltage output terminal can be simultaneously pulled down by the enable terminal. At this moment, the printing device can prompt an error such as "request for power off".

When the short circuit occurs between the high-voltage input terminal and a power terminal, voltages of the high-voltage input terminal and the high-voltage output terminal can be simultaneously pulled down by the power terminal. At this moment, the printing device can prompt an error such as "request for power off".

When the short circuit occurs among the high-voltage input terminal, the power terminal and a ground terminal, voltages of the high-voltage input terminal and the high-voltage output terminal can be simultaneously pulled down. At this moment, the printing device can prompt an error such as "request for power off".

When the short circuit occurs between the high-voltage output terminal and a clock terminal, the voltage of the high-voltage output terminal can be pulled down by the clock terminal, and the high-voltage input terminal will still send a mounting detection signal to the high-voltage output terminal normally. At this moment, the printing device cannot obtain the normal mounting detection signal via the high-voltage output terminal, and the printing device can prompt an error such as "ink cartridge mounting abnormal".

When the short circuit occurs between the high-voltage output terminal and a data terminal, the voltage of the high-voltage output terminal can be pulled down by the data terminal, and the high-voltage input terminal will still send the mounting detection signal to the high-voltage output terminal normally. At this moment, the printing device cannot obtain the normal mounting detection signal via the high-voltage output terminal, and the printing device can prompt an error such as "ink cartridge mounting abnormal".

When the short circuit occurs among the high-voltage output terminal, the data terminal and the ground terminal, the voltage of the high-voltage output terminal can be pulled down, and the high-voltage input terminal will still send the mounting detection signal to the high-voltage output terminal normally. At this moment, the printing device cannot obtain the normal mounting detection signal via the high-voltage output terminal, and the printing device can prompt an error such as "ink cartridge mounting abnormal".

Alternatively, the substrate 10 can include a first surface 10*a* and a second surface (not shown) disposed opposite to each other. The first low voltage terminal 101, the second low voltage terminal 102, the conductive lead 30, the high voltage terminal 21, and the detecting terminal 22 can be all disposed on the first surface 10*a*, and the memory 104 can be disposed on the second surface.

It should be noted that the high voltage can be greater than an operation voltage applied on a chip terminal of the consumable chip 100. Generally, the operation voltage of the consumable chip 100 can be 3.3 V or 5 V, correspondingly, the high voltage can be a voltage greater than 3.3 V or greater than 5 V, and the low voltage can be a voltage less than 3.3 V or less than 5 V.

In some embodiments, the substrate 10 can include at least one of the following structures:

the substrate 10 can be provided with a first groove 11 at a first side wall, and a first conductive layer can be disposed in the first groove 11 and defined as the at least one low voltage terminal 100*a;* the substrate 10 can be provided with a second groove 12 at a second side wall, and a second conductive layer can be disposed in the second groove 12 and defined as the at least one high voltage terminal 21; or the substrate 10 can be provided with a third groove 13 and a fourth groove 14 at a third side wall, the fourth groove 14 can be along a length direction of the substrate 10 (i.e., an x-axis direction in FIG. 8), the third groove 13 can be disposed on a side wall of the fourth groove 14, and a third conductive layer can be disposed in the third groove 13 and defined as the at least one detecting terminal 22.

Referring to FIG. 4, the first low voltage terminal 101 can include any one of an enable terminal 101*a*, a clock terminal 101*b*, a ground terminal 101*c*, a data terminal 101*d*, or a power terminal 101*e*. The second low voltage terminal 102 can also be any one of the enable terminal 101*a*, the clock terminal 101*b*, the ground terminal 101*c*, the data terminal 101*d*, or the power terminal 101*e*. In the present embodiment, the first low voltage terminal 101 can be the power terminal 101*e*, and the second low voltage terminal 102 can be the enable terminal 101*a*.

Furthermore, a first conductive layer can be disposed on the substrate 10 and defined as the first low voltage terminal 101 and/or the second low voltage terminal 102. The first low voltage terminal 101 and/or the second low voltage terminal 102 can be a solid terminal, and a shape thereof can be in any shape such as a waist-shaped hole shape, an oval shape, a semicircular shape, a rectangular shape, or the like. In the present embodiment, the first conductive layer can be made of a material having conductivity, such as a silver layer, a copper layer, a copper alloy layer, etc.

Figure 7:
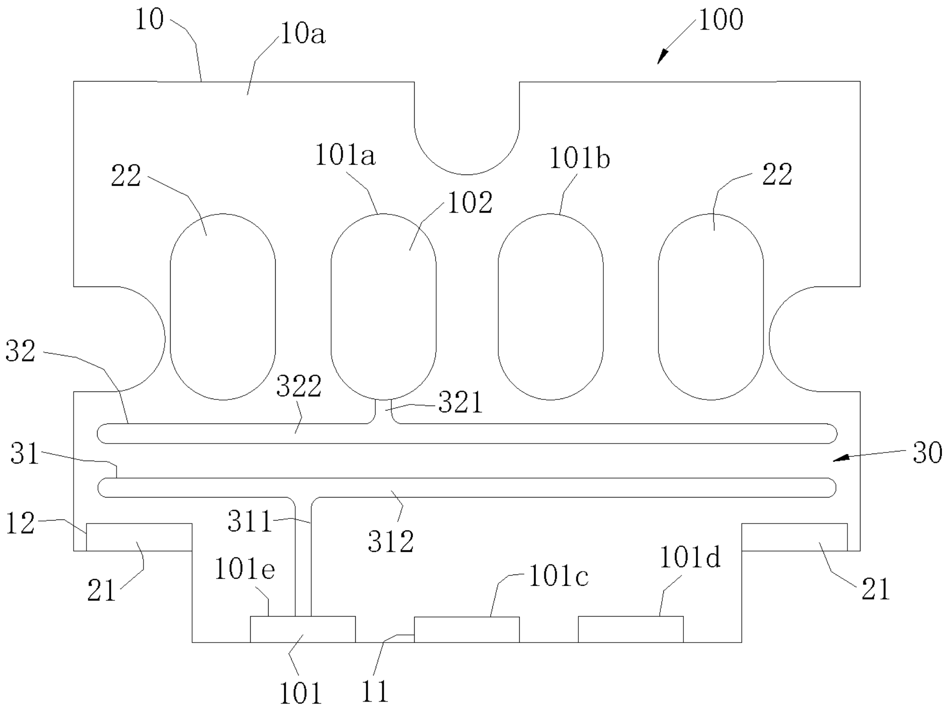
FIG. 7 is a second schematic view of a consumable chip in the first embodiment of the present disclosure.

Alternatively, the first conductive layer can be plated on the substrate 10 and defined as the first low voltage terminal 101 and/or the second low voltage terminal 102. Alternatively, the substrate 10 can be provided with the first groove 11 (as shown in FIG. 7), and the first conductive layer can be disposed in the first groove 11 and defined as the first low voltage terminal 101 and/or the second low voltage terminal 102.

Alternatively, a notch of the first groove 11 can be flush with the first side wall of the substrate 10. Alternatively, the first grove 11 can be in a rectangular shape, an oval shape, a semicircular shape, or the like. In this embodiment, the first grove 11 can be in a rectangular shape.

Furthermore, a terminal type of the first low voltage terminal 101 and that of the second low voltage terminal 102 cannot be the same. In other words, when the first low voltage terminal 101 is the enable terminal 101*a*, the second low voltage terminal 102 can be a terminal other than the enable terminal 101*a*, such as the clock terminal 101*b*, the ground terminal 101*c*, the data terminal 101*d*, or the power terminal 101*e*. When the first low voltage terminal 101 is the data terminal 101*d*, the second low voltage terminal 102 can be a terminal other than the data terminal 101*d*, such as the enable terminal 101*a*, the clock terminal 101*b*, the ground terminal 101*c*, or the power terminal 101*e*, and so on. It can be understood that in this way, the first conductive lead 31 and the second conductive lead 32 can be connected to different terminals, thereby improving effect of voltage dividing/depressurizing.

Alternatively, the substrate 10 can be provided with the enable terminal 101*a*, the clock terminal 101*b*, the ground terminal 101*c*, the data terminal 101*d*, and the power terminal 101*e* arranged in an array. The detecting terminal 22 can be connected to the ground terminal 101*c* via a resistor, so that the detecting terminal 22 can be grounded via the ground terminal 101*c* to release some abnormal great currents of the detecting terminal 22 via the ground terminal 101*c*, and protect the consumable chip 100 from being burned down due to the great currents. The data terminal 101*d* can be configured for data transmission with an external printing device, and the power terminal 101*e* can be configured to supply power to the consumer chip 100.

In the present embodiment, referring to FIG. 4, the enable terminal 101*a* and the clock terminal 101*b* can be arranged side by side, and the ground terminal 101*c*, the data terminal 101*d*, and the power terminal 101*e* can be arranged side by side. In other embodiments, the enable terminal 101*a*, the clock terminal 101*b*, the ground terminal 101*c*, the data terminal 101*d*, and the power terminal 101*e* can be arranged according to an overall structure of the actual consumable chip 100, which is not repeated herein. An arrangement way the same or similar as the present embodiment belong to a limited combination of the present embodiment.

Referring to FIG. 4, the first conductive layer can be coated on the substrate 10 and defined as the enable terminal 101*a*, the clock terminal 101*b*, the ground terminal 101*c*, the data terminal 101*d*, or the power terminal 101*e*. The shapes of the enable terminal 101*a*, the clock terminal 101*b*, the ground terminal 101*c*, the data terminal 101*d*, and the power terminal 101*e* are not limited, and can be a waist-shaped hole shape, a circle shape, a semicircular shape, an oval shape, or a rectangular shape, or the like.

In an embodiment, all the enable terminal 101*a*, the clock terminal 101*b*, the ground terminal 101*c*, the data terminal 101*d*, and the power terminal 101*e* can be in a waist-shaped hole shape. In another embodiment, referring to FIG. 7, the enable terminal 101*a* and the clock terminal 101*b* can be in a waist-shaped hole shape. The substrate 10 can be provided with the first groove 11 at the first side wall, and a first conductive layer can be disposed in the first groove 11 and defined as at least one of the ground terminal 101*c*, the data terminal 101*d*, or the power terminal 101*e*.

Referring to FIG. 4, in the present embodiment, the consumable chip 100 can include two sets of the high voltage terminal 21 and the detecting terminal 22, the two sets of the high voltage terminal 21 and the detecting terminal 22 can be disposed on the substrate 10 and separated from each other, and the two high voltage terminals 21 in the two sets of the high voltage terminal 21 and the detecting terminal 22 can be electrically connected with each other. Therefore, the two high voltage terminals 21 can abut against the high voltage contact pins on the printing device, respectively, to form a detection circuit, so that the printing device can detect mounting of the two high voltage terminals 21. The two detecting terminals 22 in the two sets of the high voltage terminal 21 and the detecting terminal 22 can be electrically connected with each other. Therefore, the two detecting terminals 22 can abut against the detecting contact pins on the printing device, respectively, to form a detection circuit, so that the printing device can detect mounting of the two detecting terminals 22.

Alternatively, a resistor R1 or a sensor can be provided between the two high voltage terminals 21, and the resistor R1 is configured for mounting detection. That is, the mounting detection section in the printing device can determine the mounting state of the two high voltage terminals 21 with the corresponding high voltage contact pins of the printing device according to a current value or a voltage value of the resistor R1. The sensor can detect the ink quantity of the consumable cartridge 200.

Furthermore, referring to FIG. 7, the substrate 10 can be provided with a second groove 12, the second groove 12 has a plurality of sidewalls, and the second conductive layer can be plated on at least one of the sidewalls of the second groove 12 and defined as the high voltage terminal on the substrate 10. In other embodiment, the second conductive layer can be plated on the substrate 10 and defined as the high voltage terminal 21.

Alternatively, the second groove 12 can be a right-angle groove. That is, the second groove 12 can be in a rectangular shape, and the high voltage contact pins can be in contact with a long side wall of the right-angle groove, so that the printing device can be in communication with the consumable chip 100. The right-angle groove has the long side wall and a short side wall, and the second conductive layer can be disposed on the long side wall and defined as the at least one high voltage terminal. The long side wall of the right-angle groove can be copper plated, and the short side wall of the right-angle groove is not copper-plated. In this way, the short side wall of the right-angle groove can only play a limiting role, and a movement of the high voltage contact pins can be effectively limited. In addition, poor contact between the high voltage contact pins and the corresponding high voltage terminal 21 can be avoided, and the damage of the consumable chip 100 caused by a short connection between the high voltage contact pins and low voltage terminals 100*a* can also be avoided.

Figure 9:
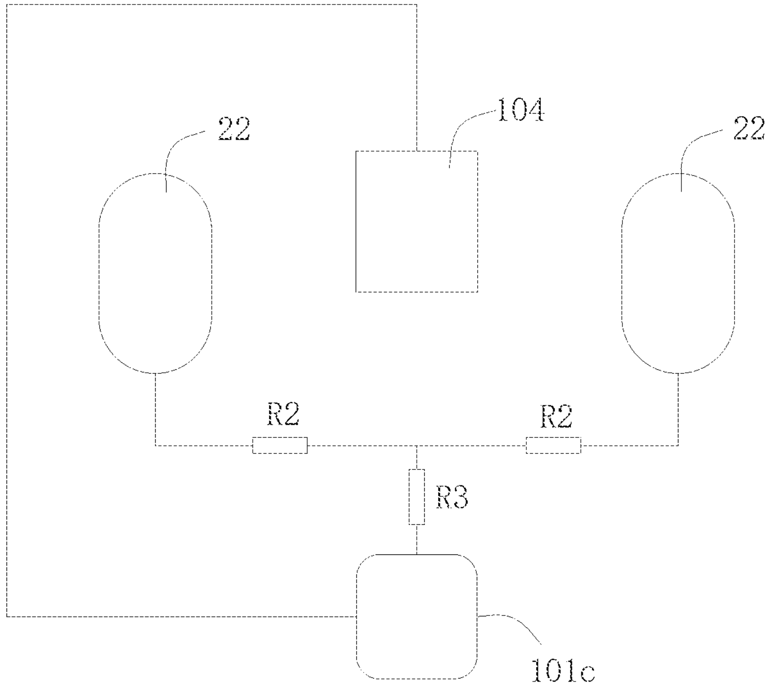
FIG. 9 is a schematic view of an electrical connection of two detecting terminals and a memory in an embodiment of the present disclosure.

Alternatively, referring to FIG. 9, the consumable chip 100 can further include a memory 104. The memory 104 can be disposed on the second surface of the substrate 10 and configured for storing information of the ink cartridge. Two resistors R2 can be connected in series between the two detecting terminals 22, and then connected to the ground terminal 101*c* after connected in parallel with the resistor R3. The memory 104 can be electrically connected to the ground terminal 101*c*, so that the two detecting terminals 22 can be electrically connected to the memory 104.

Figure 8:
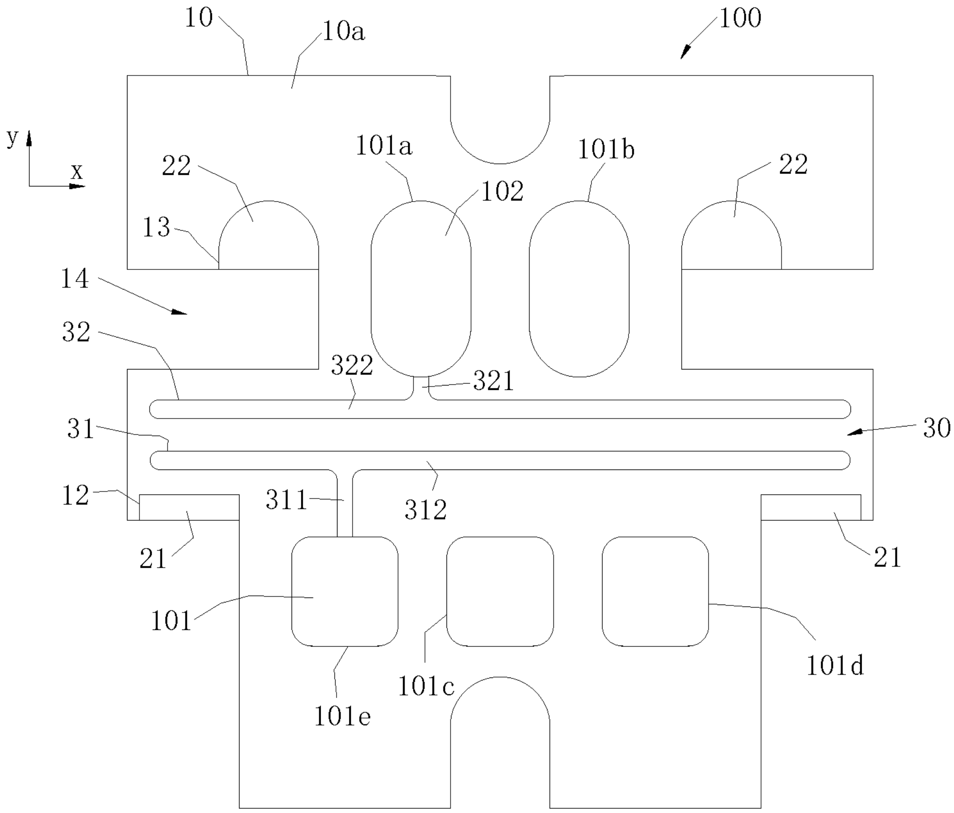
FIG. 8 is a third schematic view of a consumable chip in the first embodiment of the present disclosure.

Furthermore, referring to FIG. 8, the substrate 10 can be provided with a third groove 13, a third conductive layer can be disposed in the third groove 13, and the detecting contact pins can be in contact with the third conductive layer in the third groove 13 to realize data communication/electrical connection.

Alternatively, the third conductive layer can be plated on a groove wall of the third groove 13 and defined as the at least one detecting terminal 22 on the substrate 10.

Alternatively, the third groove 13 can be a semi-circular groove, a rectangular groove, or other forms. A bottom of the third groove 13 can be a flat surface or a curved surface, regardless of which form as long as the detecting contact pins can be fixed. The third groove 13 can be provided with the third conductive layer, and the third groove 13 can be configured to electrically contact and fix the detecting contact pins, thus preventing the detecting contact pins from shaking.

Alternatively, referring to FIG. 8, the substrate 10 can be provided with the fourth groove 14 along a length direction thereof (i.e., an x-axis direction in FIG. 8), the third groove 13 can be disposed on a side wall of the fourth groove 14, and a notch of the third groove 13 can be disposed flush with the side wall of the fourth groove 14. It can be understood that the fourth groove 14 can facilitate drainage of the ink dripping, thus further providing protection against the short circuit between the high voltage terminal 21 and the detecting terminal 22.

Referring to FIG. 4, the first conductive lead 31 can include a third connecting section 311 and a third barrier section 312. An end of the third connecting section 311 can be electrically connected to the first low voltage terminal 101, the third barrier section 312 can be connected to another end of the third connecting section 311, and both ends of the third barrier section 312 can extend between the high voltage terminal 21 and detecting terminal 22 of the two sets, respectively, which can be defined as a first layer of protection. The second conductive lead 32 can include a fourth connecting section 321 and a fourth barrier section 322. An end of the fourth connecting section 321 can be electrically connected to the second low voltage terminal 102, the fourth barrier section 322 can be connected to another end of the fourth connecting section 321, and both ends of the fourth barrier section 322 can extend between the high voltage terminal 21 and detecting terminal 22 of the two sets, respectively. The fourth barrier section 322 and the third barrier section 312 can be separated from each other, and the fourth barrier section 322 can be defined as a second layer of protection. Since two layers of protection are provided, the division and depressurize of the high voltage of the high voltage terminal 21 can be effectively ensured, and the detecting terminal 22 can be better protected. Furthermore, the first conductive lead 31 and the second conductive lead 32 which are located between the high voltage terminal 21 and the detecting terminal 22 can be separated from each other. The first conductive lead 31 can be disposed near the detecting terminal 22 relative to the second conductive lead 32, or the second conductive lead 32 can be disposed near the detecting terminal 22 relative to the first conductive lead 31. In other words, alternatively, the third barrier section 312 and the fourth barrier section 322 can be separated from each other, the third barrier section 312 can be disposed near the detecting terminal 22 relative to the fourth barrier section 322, or, the fourth barrier section 322 can be disposed near the detecting terminal 22 relative to the third barrier section 312. That is, the third barrier section 312 and the fourth barrier section 322 can be arranged in a stacked manner, so that the high voltage of the high voltage terminal 21 can be fully divided and depressurized.

Alternatively, in some embodiments, the conductive structure 3 can include at least two first conductive leads 31, and/or the conductive structure 3 can include at least two second conductive leads 32. The at least two first conductive leads 31 can be connected to the same first low voltage terminal 101, or connected to different first low voltage terminals 101, respectively. The at least two second conductive leads 32 can be connected to the same second low voltage terminal 102, or connected to different second low voltage terminals 102, respectively. In some embodiments, the conductive structure 3 can include one first conductive lead 31 and one second conductive lead 32. In some embodiments, the conductive structure 3 can include two first conductive leads 31 and one second conductive lead 32. In some embodiments, the conductive structure 3 can include one first conductive lead 31 and two second conductive leads 32. It can be understood that the number of the first conductive lead 31 and the second conductive lead 32 can be chosen according to specific designs, and referred to description in a first embodiment to a twelfth embodiment 12.

A FIRST EMBODIMENT

Referring to FIG. 4, FIG. 7 and FIG. 8, the consumable chip can include two sets of the high voltage terminal 21 and the detecting terminal 22. The first conductive lead 31 can include the third connecting section 311 and the third barrier section 312. An end of the third connecting section 311 can be electrically connected to the first low voltage terminal 101, and the third barrier section 312 can be connected to another end of the third connecting section 311. Both ends of the third barrier section 312 can correspond to the two sets of the high voltage terminal 21 and the detecting terminal 22, respectively, and extend between the high voltage terminal 21 and the detecting terminal 22 in the corresponding set, respectively. The second conductive lead 32 can include a fourth connecting section 321 and a fourth barrier section 322. An end of the fourth connecting section 321 can be electrically connected to the second low voltage terminal 102, and the fourth barrier section 322 can be connected to another end of the fourth connecting section 321. Both ends of the fourth barrier section 322 can correspond to the two sets of the high voltage terminal 21 and the detecting terminal 22, respectively, and extend between the high voltage terminal 21 and the detecting terminal 22 in the corresponding set, respectively.

Alternatively, the first low voltage terminal 101 can be the data terminal 101*d* or the power terminal 101*e*, and the second low voltage terminal 102 can be the enable terminal 101*a* or the clock terminal 101*b*. Furthermore, for one set of the high voltage terminal 21 and the detecting terminal 22, the third barrier section 312 and the fourth barrier section 322 which are located between the high voltage terminal 21 and the detecting terminal 22 can be separated from each other to effectively form two layers of protection. Therefore, when the short circuit occurs in the consumable chip 100, the high voltage of the high voltage terminal 21 can be conducted to the data terminal 101*d* or the power terminal 101*e* via the third barrier section 312, and to the enable terminal 101*a* or the clock terminal 101*b* via the fourth barrier section 322, respectively, so as to divide the high voltage and reduce voltage signals received by the detecting terminal 22, thus protecting the detecting terminal 22.

Alternatively, the first low voltage terminal 101 can be the power terminal 101*e*, and the second low voltage terminal 102 can be the enable terminal 101*a*. It can be understood that the power terminal 101*e* and the enable terminal 101*a* can be disposed in different regions of the substrate 10. In this way, it can facilitate wiring of the first conductive lead 31 and the second conductive lead 32, and a layout of the entire consumable chip 100 can be compact and reasonable. Furthermore, lengths of the first conductive lead 31 and the second conductive lead 32 can be effectively reduced, saving the cost.

Furthermore, in the present embodiment, the third barrier section 312 can be arranged in parallel with the fourth barrier section 322, and both the third barrier section 312 and the fourth barrier section 322 can be arranged in a straight line. That is, a linear conductive layer can be plated on the substrate 10 and defined as the third barrier section 312 or the fourth barrier section 322. Shapes of the third barrier section 312 and the fourth barrier section 322 can be non-linear, and can also be any shape such as a curve and a fold line according to requirements.

Furthermore, in the present embodiment, the fourth barrier segment 322 and the third barrier segment 312 can be arranged in a stacked manner along a width direction of the substrate 10 (i.e., a y-axis direction in FIG. 8). The x-axis direction is perpendicular to the y-axis direction, and the fourth barrier segment 322 can be disposed near the detecting terminal 22 relative to the third barrier segment 312.

Alternatively, a T-shape can be defined by the third connecting section 311 and the third barrier section 312, and a T-shape can also be defined by the fourth connecting section 321 and the fourth barrier section 322. That is, the first conductive lead 31 can be in T-shape, and the second conductive lead 32 can also be in T-shape. In other embodiments, the first conductive lead 31 and the second conductive lead 32 can also be in other shapes, which is not limited herein.

Furthermore, in the present embodiment, the conductive structure 3 can include one first conductive lead 31 and one second conductive lead 32.

A SECOND EMBODIMENT

Figure 10:
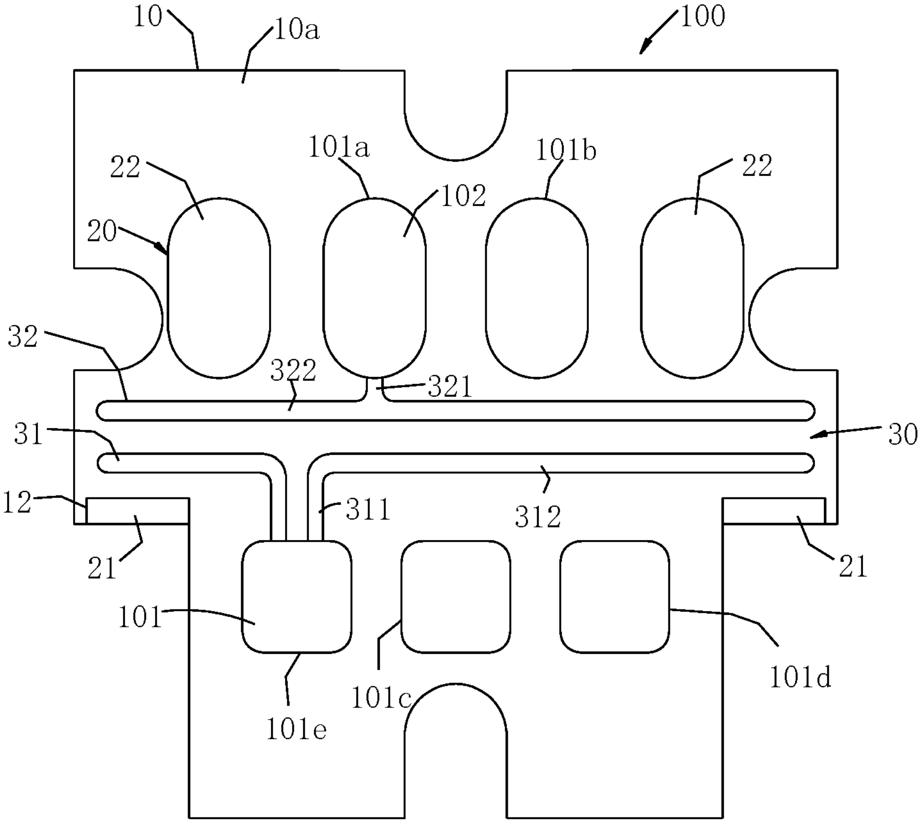
FIG. 10 is a schematic view of a consumable chip in a second embodiment of the present disclosure.

Referring to FIG. 10, a structure of the consumable chip 100 in the second embodiment can be similar to that in the first embodiment, the same parts thereof are not repeated herein, and differences between the second embodiment and the first embodiment are as follows. The conductive structure 3 can include two first conductive leads 31. An end of one first conductive lead 31 can be connected to the power terminal 101*e*, and another end of the one first conductive lead 31 can extend between the high voltage terminal 21 and the detecting terminal 22 in one set. An end of the other first conductive lead 31 can also be connected to the power terminal 101*e*, and another end of the other first conductive lead 31 can extend between the high voltage terminal 21 and the detecting terminal 22 in the other set.

Alternatively, in the present embodiment, both the two first conductive leads 31 can be in L-shape, the conductive structure 3 can include one second conductive lead 32, and the second conductive lead 32 can be in T-shape.

A THIRD EMBODIMENT

Figure 11:
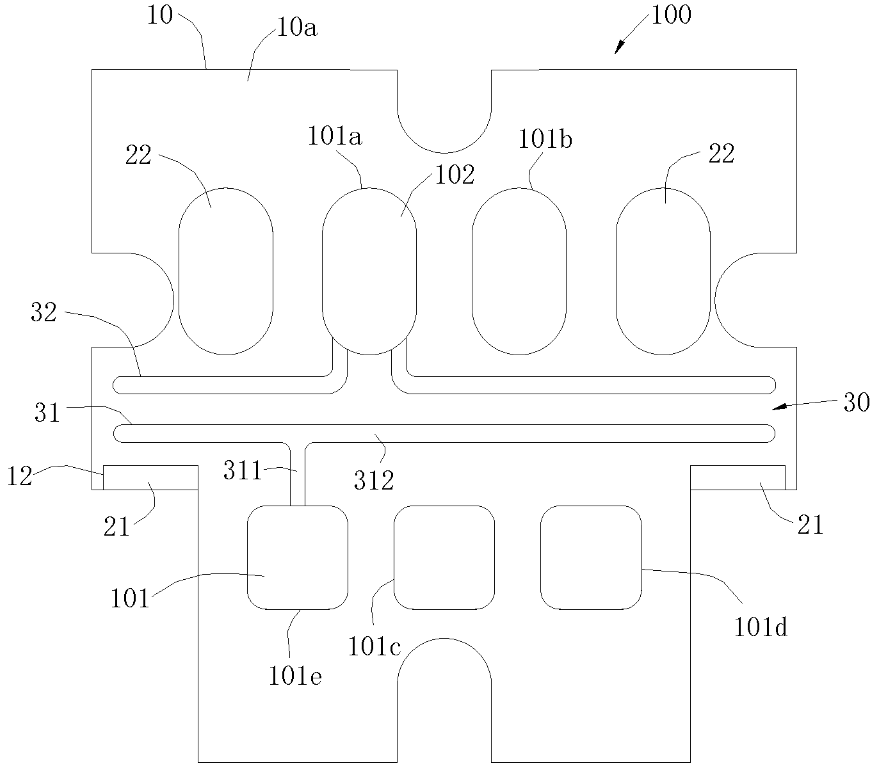
FIG. 11 is a schematic view of a consumable chip in a third embodiment of the present disclosure.

Referring to FIG. 11, a structure of the consumable chip 100 in the third embodiment can be similar to that in the first embodiment, the same parts thereof are not repeated herein, and differences between the third embodiment and the first embodiment are as follows. The conductive structure 3 can include two second conductive leads 32. An end of one second conductive lead 32 can be connected to the enable terminal 101*a*, and another end of the one second conductive lead 32 can extend between the high voltage terminal 21 and the detecting terminal 22 in one set. An end of the other second conductive lead 32 can also be connected to the enable terminal 101*a*, and another end of the other second conductive lead 32 can extend between the high voltage terminal 21 and the detecting terminal 22 in the other set.

Alternatively, in the present embodiment, the conductive structure 3 can include one first conductive lead 31, the first conductive lead 31 can be in T-shape, and both the two second conductive lead 32 can be in L-shape.

A FOURTH EMBODIMENT

Figure 12:
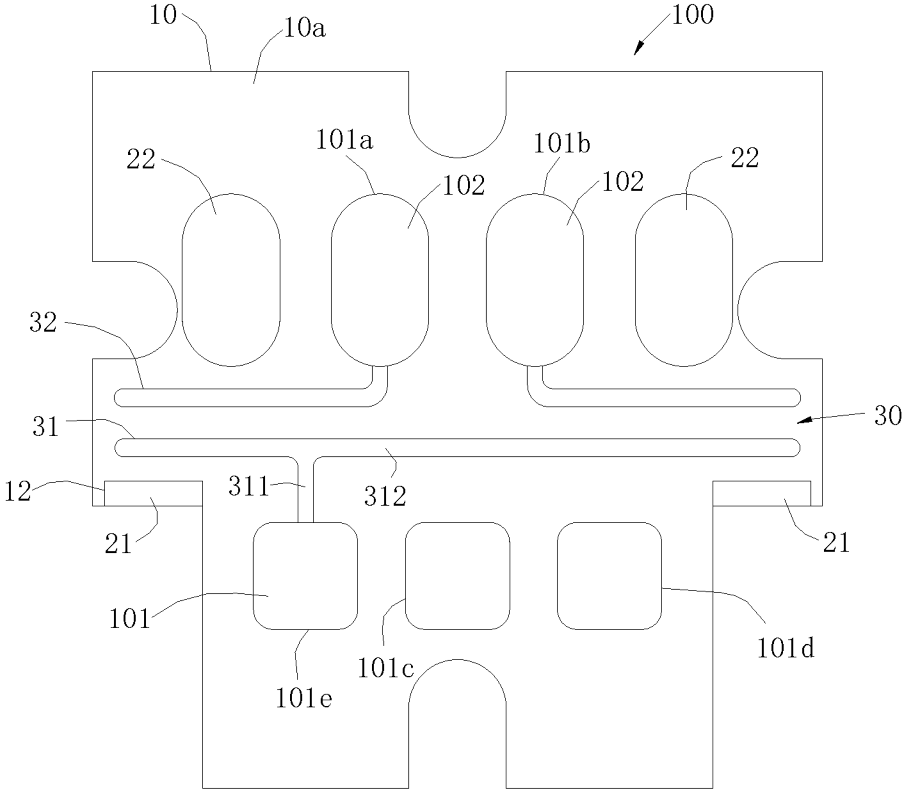
FIG. 12 is a schematic view of a consumable chip in a fourth embodiment of the present disclosure.

Referring to FIG. 12, a structure of the consumable chip 100 in the fourth embodiment can be similar to that in the third embodiment, the same parts thereof are not repeated herein, and differences between the fourth embodiment and the third embodiment are as follows. The conductive structure 3 can include two second conductive leads 32. An end of one second conductive lead 32 can be connected to the enable terminal 101*a*, and another end of the one second conductive lead 32 can extend between the high voltage terminal 21 and the detecting terminal 22 in one set. An end of the other second conductive lead 32 can be connected to the clock terminal 101*b*, and another end of the other second conductive lead 32 can extend between the high voltage terminal 21 and the detecting terminal 22 in the other set.

Alternatively, in the present embodiment, the conductive structure 3 can include one first conductive lead 31, and the first conductive lead 31 can be in T-shape. The two second conductive lead 32 can be in L-shape.

A FIFTH EMBODIMENT

Figure 13:
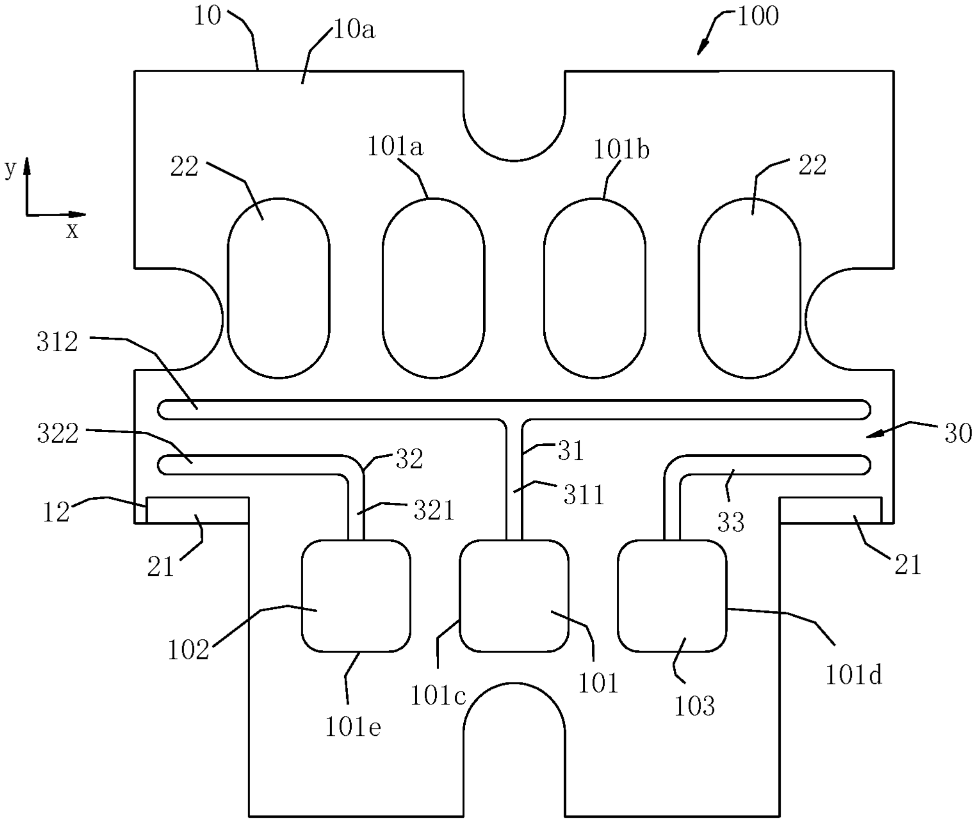
FIG. 13 is a schematic view of a consumable chip in a fifth embodiment of the present disclosure.

Referring to FIG. 13, a structure of the consumable chip 100 in the fifth embodiment can be similar to that in the first embodiment, the same parts thereof are not repeated herein, and differences between the fifth embodiment and the first embodiment are as follows. In the present embodiment, the consumable chip 100 can further include a third low voltage terminal 103, and the conductive lead 30 can further include a third conductive lead 33. The first conductive lead 31 can include the third connecting section 311 and the third barrier section 312. An end of the third connecting section 311 can be electrically connected to the first low voltage terminal 101, and the third barrier section 312 can be connected to another end of the third connecting section 311. Both ends of the third barrier section 312 can correspond to the two sets of the high voltage terminal 21 and the detecting terminal 22, respectively, and extend between the high voltage terminal 21 and the detecting terminal 22 in the corresponding set, respectively. An end of the second conductive lead 32 can be electrically connected to the second low voltage terminal 102, and another end of the second conductive lead 32 can extend between the high voltage terminal 21 and the detecting terminal 22 in one set. An end of the third conductive lead 33 can be connected to the third low voltage terminal 103, and another end of the third conductive lead 33 can extend between the high voltage terminal 21 and the detecting terminal 22 in the other set.

Alternatively, the third low voltage terminal 103 can include any one of the enable terminal 101*a*, the clock terminal 101*b*, the ground terminal 101*c*, the data terminal 101*d*, or the power terminal 101*e*.

Furthermore, the terminal type of the first low voltage terminal 101, the second low voltage terminal 102, and the third low voltage terminal 103 cannot be the same. In other words, the first low voltage terminal 101, the second low voltage terminal 102, and the third low voltage terminal 103 can be different terminals on the substrate 10. For example, when the first low voltage terminal 101 is the enable terminal 101*a* and the second low voltage terminal 102 is the clock terminal 101*b*, the third low voltage terminal 103 can be a terminal other than the enable terminal 101*a* and the clock terminal 101*b*, such as the ground terminal 101*c*, the data terminal 101*d*, or the power terminal 101*e*. When the first low voltage terminal 101 is the ground terminal 101*c* and the second low voltage terminal 102 is the power terminal 101*e*, the third low voltage terminal 103 can be a terminal other than the ground terminal 101*c* and the power terminal 101*e*, such as the enable terminal 101*a*, the clock terminal 101*b*, or the data terminal 101*d*. Other than the above two examples, terminal types of the first low voltage terminal 101, the second low voltage terminal 102, and the third low voltage terminal 103 will not be given one by one herein, and different changes are still within the scope of the disclosure.

Specifically, in an embodiment, referring to FIG. 13, the third low voltage terminal 103 can be the data terminal 101*d*, the first low voltage terminal 101 can be the ground terminal 101*c*, and the second low voltage terminal 102 can be the power terminal 101*e*. That is, the third connecting section 311 can be connected to the ground terminal 101*c*, and both ends of the third barrier section 312 away from the third connecting section 311 can extend between the high voltage terminal 21 and the detecting terminal 22 in the two sets, respectively. An end of the second conductive lead 32 can be connected to the power terminal 101*e*, and another end of the second conductive lead 32 can extend between the high voltage terminal 21 and the detecting terminal 22 in one set. An end of the third conductive lead 33 can be connected to the data terminal 101*d*, and another end of the third conductive lead 33 can extend between the high voltage terminal 21 and the detecting terminal 22 in the other set.

Furthermore, in the present embodiment, the fourth barrier segment 322 and the third barrier segment 312 can be arranged in a stacked manner along the y-axis direction (referring to FIG. 13). The x-axis direction is perpendicular to the y-axis direction, the third barrier segment 312 can be disposed near the detecting terminal 22 relative to the fourth barrier segment 322, and the first conductive lead 31 can be disposed near the detecting terminal 22 relative to the third conductive lead 33. In this way, when the short circuit occurs in the consumable chip 100, a high voltage of the high voltage terminal 21 can be first divided by the second conductive lead 32 or the third conductive wire 33, and then depressurized to the ground by the first conductive lead 31, so that the detecting terminal 22 would not accept the high voltage, thus protecting the detecting terminal 22.

Alternatively, referring to FIG. 13, a T-shape can be defined by the third connecting section 311 and the third barrier section 312, i.e., the first conductive lead 31 can be in T-shape. The second conductive lead 32 can be in L-shape, the third conductive lead 33 can be in L-shape, and the third conductive lead 33 and the second conductive lead 32 can be arranged symmetrically with the ground terminal 101*c* as a symmetric point.

In the present embodiment, the conductive structure 3 can include one first conductive lead 31, one second conductive lead 32, and one third conductive lead 33.

A SIXTH EMBODIMENT

Figure 14:
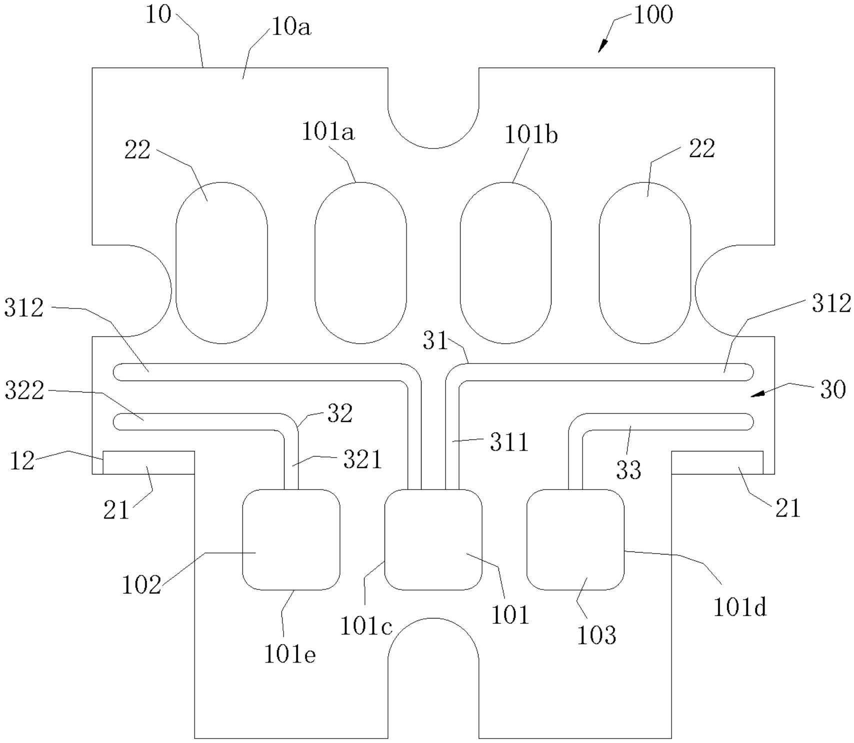
FIG. 14 is a schematic view of a consumable chip in a sixth embodiment of the present disclosure.

Referring to FIG. 14, a structure of the consumable chip 100 in the sixth embodiment can be similar to that in the fifth embodiment, the same parts thereof are not repeated herein, and differences between the sixth embodiment and the fifth embodiment are as follows. The conductive structure 3 can include two first conductive leads 31, an end of one first conductive lead 31 can be connected to the ground terminal 101*c*, and another end of the one first conductive lead 31 can extend between the high voltage terminal 21 and the detecting terminal 22 in one set. An end of the other first conductive lead 31 can also be connected to the ground terminal 101*c*, and another end of the other first conductive lead 31 can extend between the high voltage terminal 21 and the detecting terminal 22 in the other set.

In the present embodiment, the first conductive lead 31 can be in L-shape, the second conductive lead 32 can be in L-shape, and the third conductive lead 33 can also be in L-shape.

A SEVENTH EMBODIMENT

Figure 15:
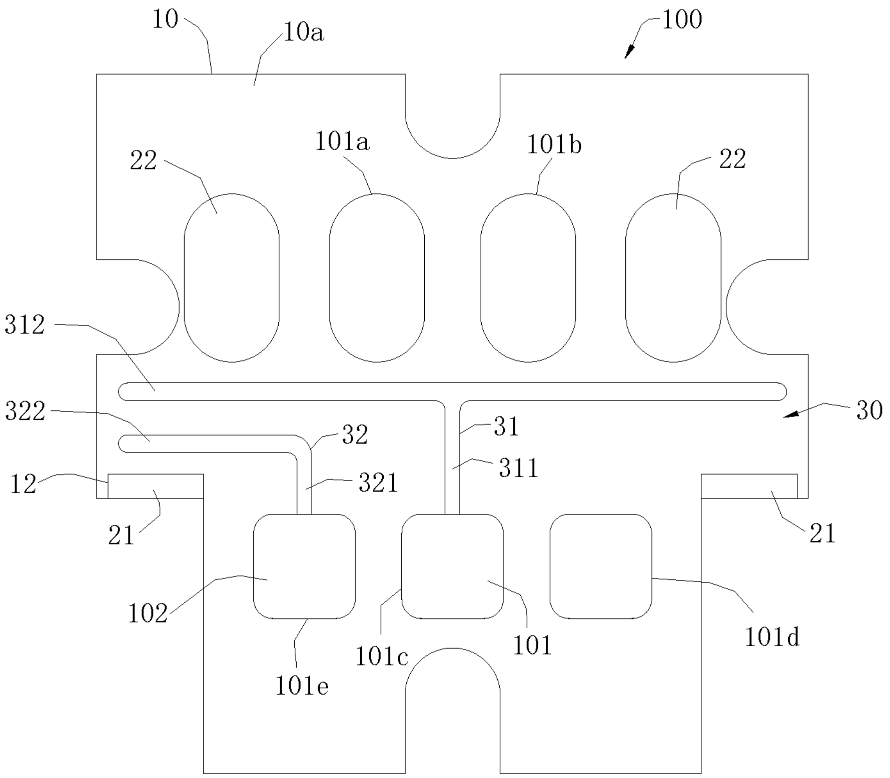
FIG. 15 is a schematic view of a consumable chip in a seventh embodiment of the present disclosure.

Referring to FIG. 15, a structure of the consumable chip 100 in the seventh embodiment can be similar to that in the second embodiment, the same parts thereof are not repeated herein, and differences between the seventh embodiment and the second embodiment are as follows. Both ends of the third barrier section 312 can correspond to the two sets of the high voltage terminal 21 and the detecting terminal 22, respectively, and extend between the high voltage terminal 21 and the detecting terminal 22 in the corresponding set, respectively. The third barrier section 312 can be connected to the third connecting section 311, and the third connecting section 311 can be connected to the first low voltage terminal 101. The fourth barrier section 322 can correspond to one set of the high voltage terminal 21 and the detecting terminal 22, an end of the fourth barrier section 322 can be connected to the fourth connecting section 321, and another end of the fourth barrier section 322 can extend between the high voltage terminal 21 and detecting terminal 22 in one corresponding set. An end of the fourth barrier section 322 can be connected to the fourth connecting section 321, and the fourth connecting section 321 can be connected to the second low voltage terminal 102. It can be understood that the first conductive lead 31 and the second conductive lead 32 can be disposed between the high voltage terminal 21 and the detecting terminal 22 in one set, and the first conductive lead 31 can be disposed between the high voltage terminal 21 and the detecting terminal 22 in the other set. In the present embodiment, the first low voltage terminal 101 or the second low voltage terminal 102 can include one of the enable terminal 101*a*, the clock terminal 101*b*, the data terminal 101*d*, the power terminal 101*e*, or the ground terminal 101*c*.

Alternatively, an end of the third connecting section 311 can be electrically connected to the ground terminal 101*c*, i.e., the first conductive lead 31 can be connected to the ground terminal 101*c*, and the second conductive lead 32 can be connected to a terminal other than the ground terminal 101*c*, such as the enable terminal 101*a*, the clock terminal 101*b*, the data terminal 101*d*, or the power terminal 101*e*. Furthermore, the third barrier section 312 can be disposed near the detecting terminal 22 relative to the fourth barrier section 322. In this way, in one set of the high voltage terminal 21 and the detecting terminal 22, between which the first conductive lead 31 and second conductive lead 32 are located, when the short circuit occurs between the high voltage terminal 21 and the detecting terminal 22, a high voltage of the high voltage terminal 21 can be first divided by the fourth barrier section 322, and then depressurized by the third barrier section 312, so that two layers of protection can be provided. For the other set of the high voltage terminal 21 and the detecting terminal 22, a high voltage of the high voltage terminal 21 can be depressurized by the third barrier section 312.

Alternatively, the first conductive lead 31 can be in T-shape, and the second conductive lead 32 can be in L-shape.

AN EIGHTH EMBODIMENT

Figure 16:
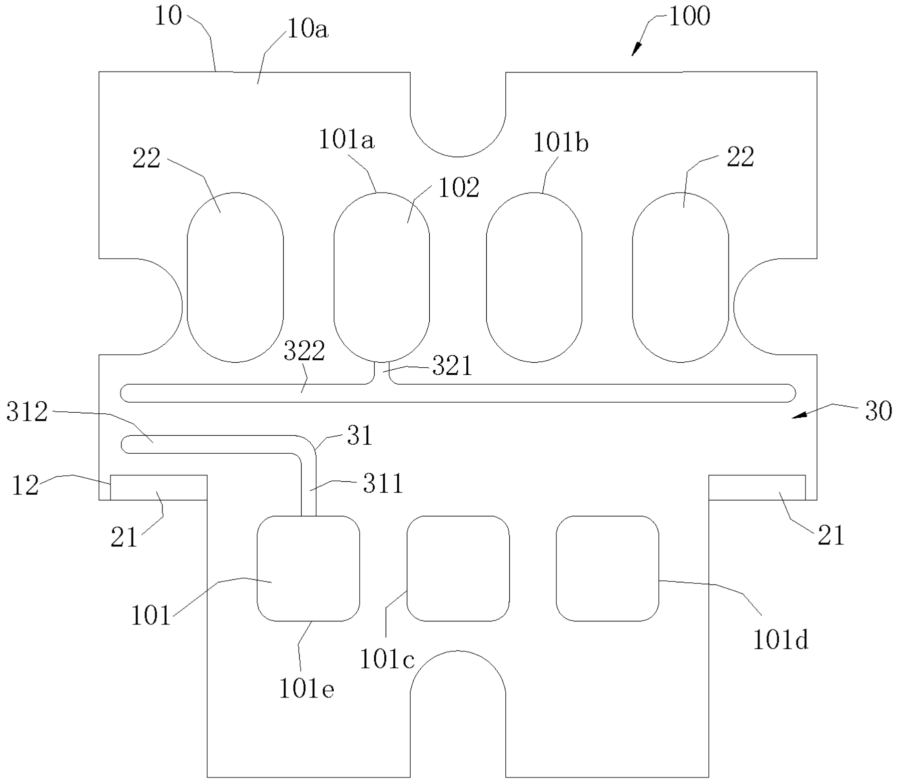
FIG. 16 is a schematic view of a consumable chip in an eighth embodiment of the present disclosure.

Referring to FIG. 16, a structure of the consumable chip 100 in the eighth embodiment can be similar to that in the second embodiment, the same parts thereof are not repeated herein, and differences between the eighth embodiment and the second embodiment are as follows. Both ends of the fourth barrier section 322 can correspond to the two sets of the high voltage terminal 21 and the detecting terminal 22, respectively, and extend between the high voltage terminal 21 and the detecting terminal 22 in the corresponding set, respectively. The fourth barrier section 322 can be connected to the fourth connecting section 321, and the fourth connecting section 321 can be connected to a second low voltage terminal 102. The third barrier section 312 can correspond to one set of the high voltage terminal 21 and the detecting terminal 22, an end of the third barrier section 312 can be connected to the third connecting section 311, and another end of the third barrier section 312 can extend between the high voltage terminal 21 and detecting terminal 22 in one corresponding set. The third connecting section 311 can be connected to the first low voltage terminal 101. It can be understood that the first conductive lead 31 and the second conductive lead 32 can be disposed between the high voltage terminal 21 and the detecting terminal 22 in one set, and the first conductive lead 31 can be disposed between the high voltage terminal 21 and the detecting terminal 22 in the other set. In the present embodiment, the first low voltage terminal 101 or the second low voltage terminal 102 can include any one of the enable terminal 101*a*, the clock terminal 101*b*, the data terminal 101*d*, the power terminal 101*e*, or the ground terminal 101*c*.

In the present embodiment, the first low voltage terminal 101 can be the power terminal 101*e*, and the second low voltage terminal 102 can be the enable terminal 101*a*. The first conductive lead 31 can be in L-shape, and the second conductive lead 32 can be in T-shape.

A NINTH EMBODIMENT

Figure 17:
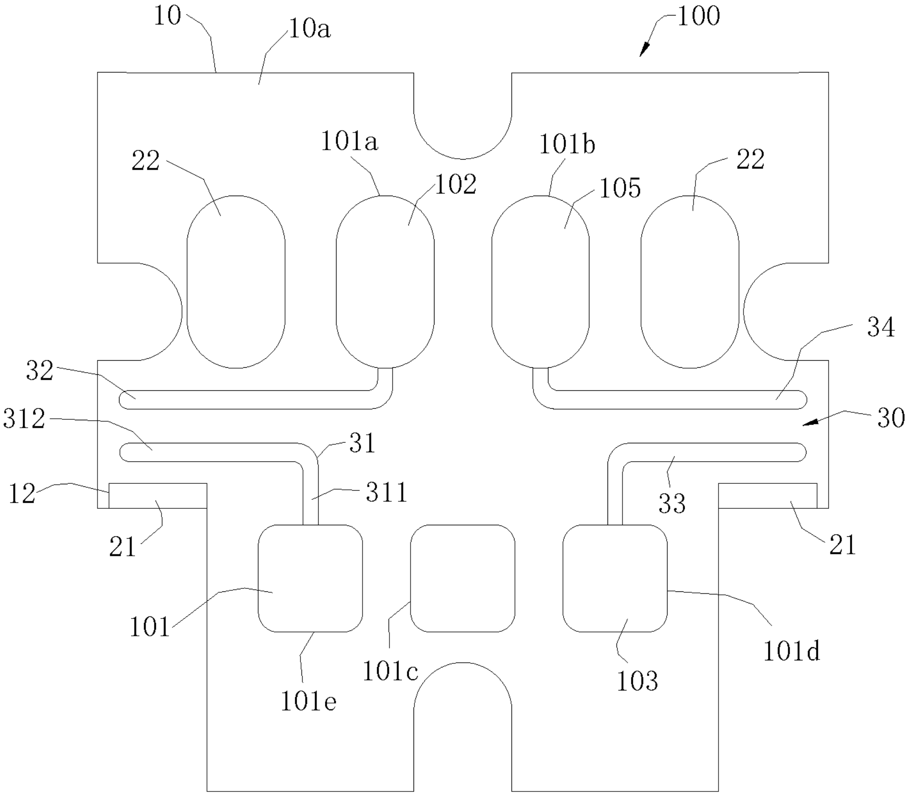
FIG. 17 is a schematic view of a consumable chip in a ninth embodiment of the present disclosure.

Referring to FIG. 17, a structure of the consumable chip 100 in the ninth embodiment can be similar to that in the first embodiment, the same parts thereof are not repeated herein, and differences between the ninth embodiment and the first embodiment are as follows. In the present embodiment, the consumable chip 100 can further include a third low voltage terminal 103 and a fourth low voltage terminal 105, the conductive lead 30 can further include a third conductive lead 33 and a fourth conductive lead 34. In order to describe a relationship between each conductive lead and each low voltage terminal, the two sets of the high voltage terminal 21 and the detecting terminal 22 can be defined as a first set and a second set.

Specifically, an end of the first conductive lead 31 can be electrically connected to the first low voltage terminal 101, and another end of the first conductive lead 31 can extend between the high voltage terminal 21 and the detecting terminal 22 in the first set. An end of the second conductive lead 32 can be electrically connected to the second low voltage terminal 102, and another end of the second conductive lead 32 can extend between the high voltage terminal 21 and the detecting terminal 22 in the first set. An end of the third conductive lead 33 can be electrically connected to the third low voltage terminal 103, and another end of the third conductive lead 33 can extend between the high voltage terminal 21 and the detecting terminal 22 in the second set. An end of the fourth conductive lead 34 can be electrically connected to the fourth low voltage terminal 105, and another end of the fourth conductive lead 34 can extend between the high voltage terminal 21 and the detecting terminal 22 in the second set. In this way, two layers of protection can be provided between the two sets of the high voltage terminal 21 and the detecting terminal 22.

Alternatively, the third low voltage terminal 103 can include any one of the enable terminal 101*a*, the clock terminal 101*b*, the ground terminal 101*c*, the data terminal 101*d*, or the power terminal 101*e*. The fourth low voltage terminal 105 can include any one of the enable terminal 101*a*, the clock terminal 101*b*, the ground terminal 101*c*, the data terminal 101*d*, or the power terminal 101*e*.

Furthermore, the terminal type of the first low voltage terminal 101, the second low voltage terminal 102, the third low voltage terminal 103, and the fourth low voltage terminal 105 cannot be the same. In other words, the first low voltage terminal 101, the second low voltage terminal 102, the third low voltage terminal 103, and the fourth low voltage terminal 105 can be different terminals on the substrate 10. For example, when the first low voltage terminal 101 is the enable terminal 101*a*, the second low voltage terminal 102 is the clock terminal 101*b*, and the third low voltage terminal 103 is the data terminal 101*d*, then the fourth low voltage terminal 105 can be a terminal other than the enable terminal 101*a*, the clock terminal 101*b*, and the data terminal 101*d*, such as the ground terminal 101*c* or the power terminal 101*e*. It is understood that the above terminal types can be selected according to actual situations, and simple and reasonable arrangements of the terminals are still within the scope of the disclosure.

Specifically, referring to FIG. 17, in order to get compact and reasonable arrangements, in the present embodiment, the first low voltage terminal 101 can be the power terminal 101*e*, the second low voltage terminal 102 can be the enable terminal 101*a*, the third low voltage terminal 103 can be the data terminal 101*d*, and the fourth low voltage terminal 105 can be the clock terminal 101*b*. In this way, the enable terminal 101*a* and the clock terminal 101*b* can be in the same area of the substrate, the power terminal 101*e* and the data terminal 101*d* can be also located in the same area of the substrate, the first conductive lead 31 and the second conductive lead 32 can correspond to the first set, and the third conductive lead 33 and the fourth conductive lead 34 can correspond to the second set. The above arrangements can be provided, not only an extension path of the conductive lead can be the shortest and best, but also the arrangements can be more compact and reasonable.

Alternatively, in the present embodiment, the first conductive lead 31, the second conductive lead 32, the third conductive lead 33, and the fourth conductive lead 34 can be in the same shape and in L-shape.

A TENTH EMBODIMENT

Figure 18:
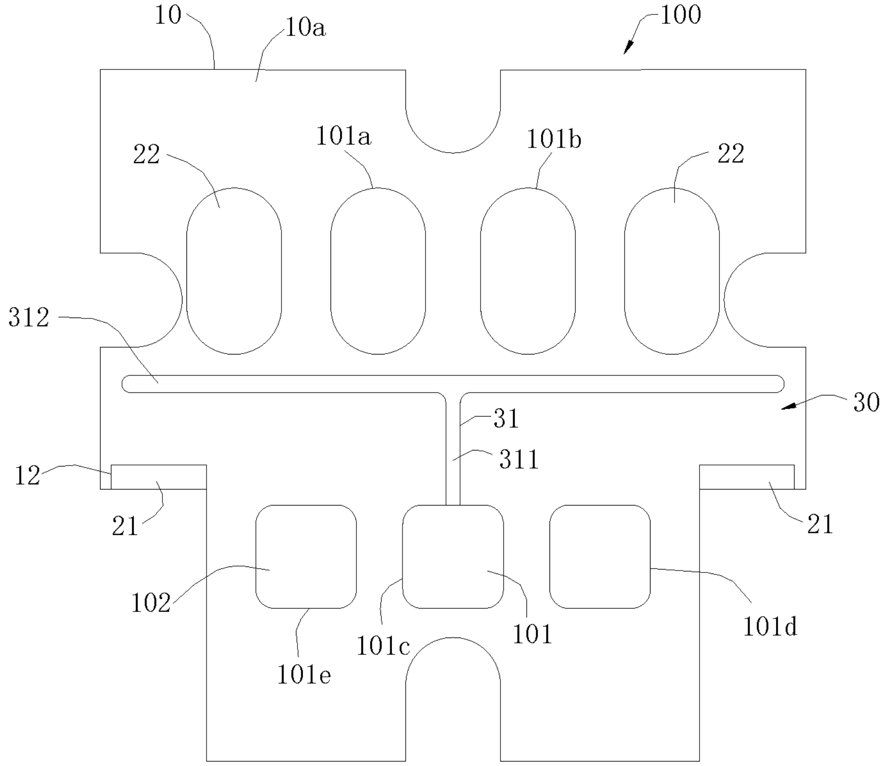
FIG. 18 is a schematic view of a consumable chip in a tenth embodiment of the present disclosure.

Referring to FIG. 18, a structure of the consumable chip 100 in the tenth embodiment can be similar to that in the seventh embodiment, the same parts thereof are not repeated herein, and differences between the tenth embodiment and the seventh embodiment are as follows. Both ends of the third barrier section 312 can correspond to the two sets of the high voltage terminal 21 and the detecting terminal 22, respectively, and extend between the high voltage terminal 21 and the detecting terminal 22 in one corresponding set, respectively. The third barrier section 312 can be connected to the third connecting section 311, and the third connecting section 311 can be connected to the first low voltage terminal 101. The fourth barrier section 322 and the fourth connecting section 321 are not provided. It can be understood that the first conductive lead 31 can be disposed between the high voltage terminal 21 and the detecting terminal 22 in one set, and the first conductive lead 31 can also be disposed between the high voltage terminal 21 and the detecting terminal 22 in the other set. In the present embodiment, the first low voltage terminal 101 can include any one of the enable terminal 101*a*, the clock terminal 101*b*, the data terminal 101*d*, the power terminal 101*e*, or the ground terminal 101*c*.

Alternatively, an end of the third connecting section 311 can be electrically connected to the ground terminal 101*c*, i.e., the first conductive lead 31 can be connected to the ground terminal 101*c*. In this way, in one set of the high voltage terminal 21 and the detecting terminal 22, between which the first conductive lead 31 is located, when the short circuit occurs between the high voltage terminal 21 and the detecting terminal 22, a high voltage of the high voltage terminal 21 can be depressurized by the third barrier section 312, so that protection for shirt circuit can be provided.

Alternatively, the first conductive lead 31 can be in T-shape.

AN ELEVENTH EMBODIMENT

Figure 19:
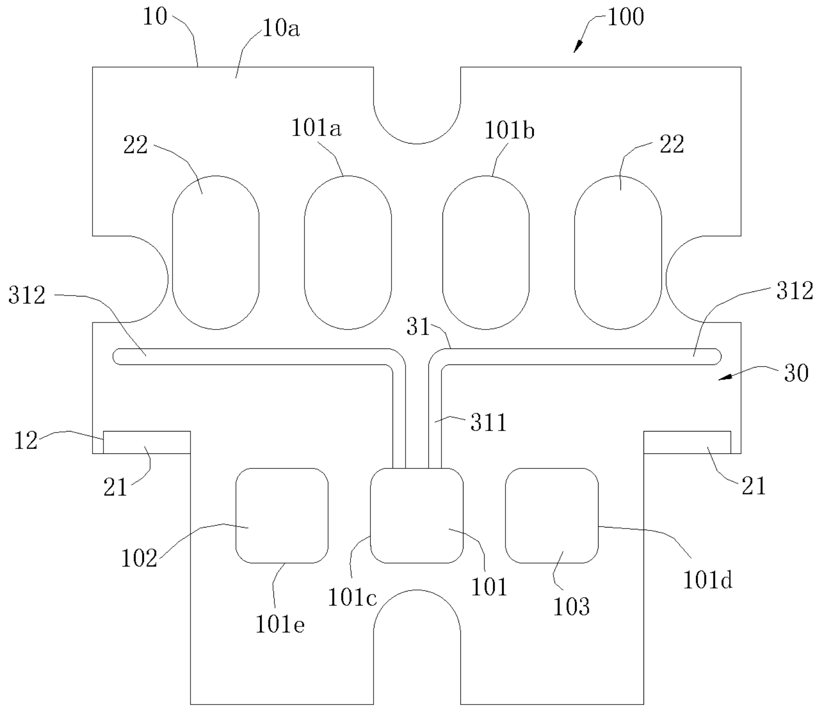
FIG. 19 is a schematic view of a consumable chip in an eleventh embodiment of the present disclosure.

Referring to FIG. 19, a structure of the consumable chip 100 in the eleventh embodiment can be similar to that in the tenth embodiment, the same parts thereof are not repeated herein, and differences between the eleventh embodiment and the tenth embodiment are as follows. The conductive structure 3 can include two first conductive leads 31. An end of one first conductive lead 31 can be connected to the ground terminal 101*c*, and another end of the one first conductive lead 31 can extend between the high voltage terminal 21 and the detecting terminal 22 in one set. An end of the other first conductive lead 31 can also be connected to the ground terminal 101*c*, and another end of the other first conductive lead 31 can extend between the high voltage terminal 21 and the detecting terminal 22 in the other set.

The first conductive lead 31 can be in L-shape.

A TWELFTH EMBODIMENT

Figure 20:
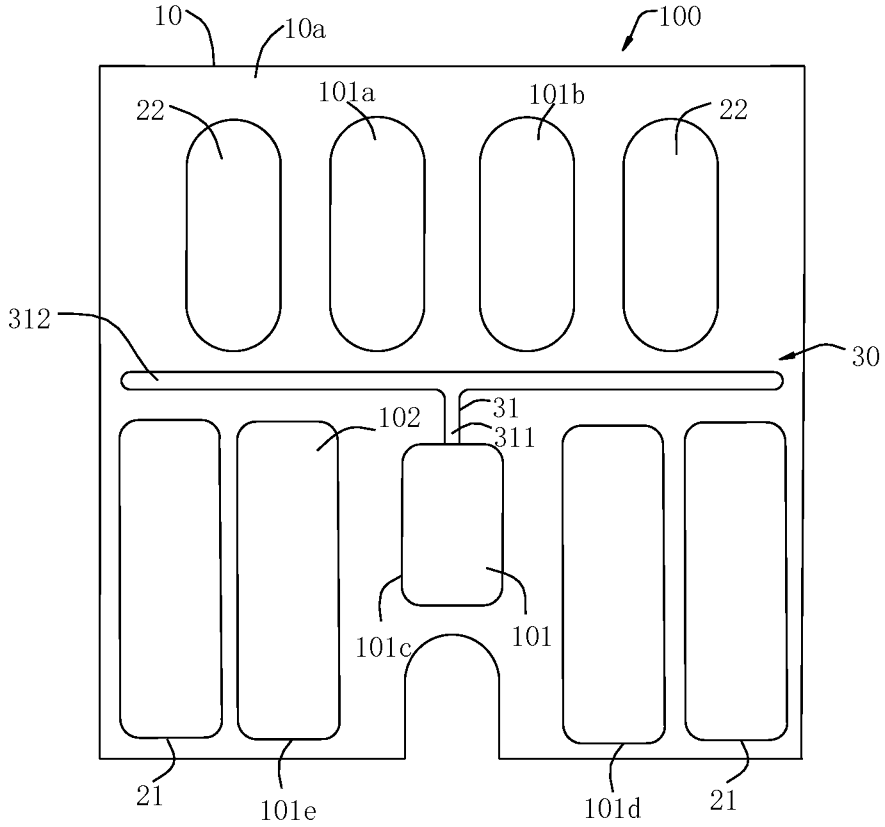
FIG. 20 is a first schematic view of a consumable chip in a twelfth embodiment of the present disclosure.

Referring to FIG. 20 and FIG. 21, a structure of the consumable chip 100 in the twelfth embodiment can be similar to that in the tenth embodiment and the eleventh embodiment, the same parts thereof are not repeated herein, and differences among the twelfth embodiment, and the tenth embodiment and the eleventh embodiment are as follows. Each terminal can occupy a larger area on the substrate 10 than that in the tenth embodiment and the eleventh embodiment, which facilitates improving connection stability between the contact pins of the printing device and the terminals of the consumable chip.

It should be noted that, although the conductive lead 30 is provided in each of the above embodiments, specific composition of the conductive structure 3 is not limited in the present disclosure, such as a metal lead. The conductive lead 30 can be replaced by lead structures with other materials having conductive functions, such as alloys, conductive rubber, conductive plastics, polymer conductive materials, etc.

The present embodiment further provides a manufacturing method of a consumable chip for preparing the above consumable chip.

Referring to FIG. 22, the manufacturing method of the consumable chip includes: disposing a memory 104, at least one low voltage terminal 100*a* electrically connected to the memory 104, at least one high voltage terminal 21, and at least one detecting terminal 22 on a substrate 10, and the at least one high voltage terminal 21 and the at least one detecting terminal 22 being separated from each other; and disposing a conductive structure 3 on the substrate 10, an end of the conductive structure 3 being electrically connected to the at least one low voltage terminal 100*a*, and extending another end of the conductive structure 3 between the at least one high voltage terminal 21 and the at least one detecting terminal 22.

In an embodiment, the consumable chip 100 can include two sets of the high voltage terminal 21 and the detecting terminal 22, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22; and electrically connecting the at least one low voltage terminal 100*a* to the at least one conductive structure 3, an end of the conductive structure 3 being electrically connected to the at least one low voltage terminal 100*a*, and extending another end of the conductive structure 3 between the high voltage terminal 21 and the detecting terminal 22 in at least one set.

In an embodiment, the method can further include:

disposing at least two conductive structures 3 between the high voltage terminal 21 and the detecting terminal 22 in each same set; or disposing one conductive structure 3 between the high voltage terminal 21 and the detecting terminal 22 in one set, and disposing at least two conductive structures 3 between the high voltage terminal 21 and the detecting terminal 22 in the other set.

In an embodiment, the method can further include: providing a metal lead as the conductive structure 3.

In an embodiment, the method can further include: arranging the conductive structure 3 in T-shape or in L-shape.

In an embodiment, the method can further include:

providing a first groove 11 at a first side wall of the substrate 10, disposing a first conductive layer in the first groove 11, and the first conductive layer being defined as the at least one low voltage terminal 100*a;* providing a second groove 12 at a second side wall of the substrate 10, disposing a second conductive layer in the second groove 12, and the second conductive layer being defined as the at least one high voltage terminal 21; or providing a third groove 13 and a fourth groove 14 at a third side wall of the substrate 10, disposing the fourth groove 14 along a length direction of the substrate 10, disposing the third groove 13 on a side wall of the fourth groove 14, disposing the third conductive layer in the third groove 13, and the third conductive layer being defined as the at least one detecting terminal 22.

In an embodiment, the method can further include:

providing a right-angle groove as the second groove 12, the right-angle groove having a long side wall and a short side wall, and disposing the second conductive layer on the long side wall, and the second conductive layer being defined as the at least one high voltage terminal 21.

In an embodiment, the conductive structure 3 can include the connecting section 301 and the barrier section 302, and the method can further include: electrically connecting an end of the connecting section 301 to the at least one low voltage terminal 100*a*, electrically connecting another end of the connecting section 301 to the barrier section 302, and extending both ends of the barrier section 302 between the high voltage terminal 21 and the detecting terminal 22.

In an embodiment, the consumable chip 100 can include two sets of the high voltage terminal 21 and the detecting terminal 22. The conductive structure 3 can include a conductive lead 30, the conductive lead 30 can include the connecting section 301 and the barrier section 302, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22; and electrically connecting an end of the connecting section 301 to at least one low voltage terminal 100*a*, and connecting another end of the connecting section 301 to the barrier section 302.

Both ends of the barrier section 302 can correspond to the two sets of the high voltage terminal 21 and the detecting terminal 22, respectively, and extend between the high voltage terminal 21 and the detecting terminal 22 in one corresponding set, respectively.

In an embodiment, the consumable chip can include two sets of the high voltage terminal 21 and the detecting terminal 22, the conductive structure 3 can include a plurality of conductive leads 30, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22; and electrically connecting an end of at least one conductive lead 30 to the at least one low voltage terminal 100*a*, and extending another end of the conductive lead 30 between the high voltage terminal 21 and the detecting terminal 22 in one set; electrically connecting an end of at least one conductive lead 30 to the at least one low voltage terminal 100*a*, and extending another end of the conductive lead 30 between the high voltage terminal 21 and the detecting terminal 22 in the other set.

In an embodiment, another end of the conductive lead 30 extends between the high voltage terminal 21 and the detecting terminal 22 in one set, the conductive lead 30 can include a first connecting section 303 and a first barrier section 304, and the method can further include:

electrically connecting an end of the first connecting section 303 to at least one low voltage terminal 100*a*, and connecting another end of the first connecting section 303 to the first barrier section 304; both ends of the first barrier section 304 corresponding to the two sets of the high voltage terminal 21 and the detecting terminal 22, respectively, and extending both ends of the first barrier section 304 between the high voltage terminal 21 and the detecting terminal 22 in one corresponding set, respectively; and/or another end of the conductive lead 30 extends between the high voltage terminal 21 and the detecting terminal 22 in the other set, the conductive lead 30 can include a second connecting section 305 and a second barrier section 306, and the method can further include:

electrically connecting an end of the second connecting section 305 to at least one low voltage terminal 100*a*, and connecting another end of the second connecting section 305 to the second barrier section 305; both ends of the second barrier section 306 corresponding to the two sets of the high voltage terminal 21 and the detecting terminal 22, respectively, and extending both ends of the second barrier section 306 between the high voltage terminal 21 and the detecting terminal 22 in one corresponding set, respectively.

In an embodiment, the at least one low voltage terminal 100*a* can include a first low voltage terminal 101 and a second low voltage terminal 102 separated from each other, the conductive structure 3 can include a first conductive lead 31 and a second conductive lead 32, and the method can further include:

electrically connecting an end of the first conductive lead 31 to the first low voltage terminal 101, and extending another end of the first conductive lead 31 between the high voltage terminal 21 and the detecting terminal 22 in one set; and electrically connecting an end of the second conductive lead 32 to the second low voltage terminal 102, and extending another end of the second conductive lead 32 between the high voltage terminal 21 and the detecting terminal 22 in one set corresponding to the first conductive lead 31.

In an embodiment, the consumable chip can include two sets of the high voltage terminal 21 and the detecting terminal 22, the first conductive lead 31 can include a third connecting section 311 and a third barrier section 312, the second conductive lead 32 can include a fourth connecting section 321 and a fourth barrier section 322, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22; electrically connecting an end of the third connecting section 311 to the first low voltage terminal 101, and connecting the third barrier section 312 to the third connecting section 311; and electrically connecting an end of the fourth connecting section 321 to the second low voltage terminal 102, and connecting the fourth barrier section 322 to the fourth connecting section 321; corresponding both ends of the third barrier section 312 to the two sets of the high voltage terminal 21 and the detecting terminal 22, respectively, and extending both ends of the third barrier section 312 between the high voltage terminal 21 and the detecting terminal 22 in one corresponding set, respectively; or corresponding the third barrier section 312 to one set of the high voltage terminal 21 and the detecting terminal 22, connecting an end of the third barrier section 312 to the third connecting section 311, and extending another end of the third barrier section 312 between the high voltage terminal 21 and detecting terminal 22 in one corresponding set; and corresponding both ends of the fourth barrier section 322 to the two sets of the high voltage terminal 21 and the detecting terminal 22, respectively, and extending both ends of the fourth barrier section 322 between the high voltage terminal 21 and the detecting terminal 22 in one corresponding set, respectively; or corresponding the fourth barrier section 322 to one set of the high voltage terminal 21 and the detecting terminal 22, connecting an end of the fourth barrier section 322 to the fourth connecting section 321, and extending another end of the fourth barrier section 322 between the high voltage terminal 21 and detecting terminal 22 in one corresponding set.

In an embodiment, the conductive structure 3 can include at least two first conductive leads 31, and/or the conductive structure 3 can include at least two second conductive leads 32, and the method can further include:

connecting the at least two first conductive leads 31 to the same first low voltage terminal 101, or to different first low voltage terminals 101, respectively; and connecting the at least two second conductive leads 32 to the same second low voltage terminal 102, or to different second low voltage terminals 102, respectively.

In an embodiment, the consumable chip can include two sets of the high voltage terminal 21 and the detecting terminal 22. The consumable chip can further include a third low voltage terminal 103, the conductive lead 30 can further include a third conductive lead 33, the first conductive lead 31 can include a third connecting section 311 and a third barrier section 312, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22; electrically connecting an end of the third connecting section 311 to the first low voltage terminal 101, and connecting the third barrier section 312 to the third connecting section 311; and corresponding both ends of the third barrier section 312 to the two sets of the high voltage terminal 21 and the detecting terminal 22, respectively, and extending both ends of the third barrier section 312 between the high voltage terminal 21 and the detecting terminal 22 in one corresponding set, respectively;

electrically connecting an end of the second conductive lead 32 to the second low voltage terminal 101, and extending another end of the second conductive lead 32 between the high voltage terminal 21 and the detecting terminal 22 in one set; and electrically connecting an end of the third conductive lead 33 to the third low voltage terminal 103, and extending another end of the third conductive lead 33 between the high voltage terminal 21 and the detecting terminal 22 in the other set.

In an embodiment, the consumable chip can include two sets of the high voltage terminal 21 and the detecting terminal 22. The consumable chip can further include the third low voltage terminal 103, the conductive lead 30 can further include the third conductive lead 33, the conductive structure 3 can include two first conductive leads 31, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22;

corresponding the two first conductive leads 31 to the two sets of the high voltage terminal 21 and the detecting terminal 22, respectively; connecting an end of one first conductive lead 31 to the first low voltage terminal 101, and extending another end of the one first conductive lead 31 between the high voltage terminal 21 and the detecting terminal 22 in one corresponding set; connecting an end of the other first conductive lead 31 to the first low voltage terminal 101, and extending another end of the other first conductive lead 31 between the high voltage terminal 21 and the detecting terminal 22 in one corresponding set;

electrically connecting an end of the second conductive lead 32 to the second low voltage terminal 101, and extending another end of the second conductive lead 32 between the high voltage terminal 21 and the detecting terminal 22 in one set; and electrically connecting an end of the third conductive lead 33 to the third low voltage terminal 103, and extending another end of the third conductive lead 33 between the high voltage terminal 21 and the detecting terminal 22 in the other set.

In an embodiment, the consumable chip can include two sets of the high voltage terminal 21 and the detecting terminal 22. The consumable chip 100 can further include a third low voltage terminal 103 and a fourth low voltage terminal 105, the conductive lead 30 can further include a third conductive lead 33 and a fourth conductive lead 34, and the method can further include:

disposing the two sets of the high voltage terminal 21 and the detecting terminal 22 on the substrate 10, and one set of the high voltage terminal 21 and the detecting terminal 22 being separated from the other set of the high voltage terminal 21 and the detecting terminal 22;

electrically connecting an end of the first conductive lead 31 to the first low voltage terminal 101, and extending another end of the first conductive lead 31 between the high voltage terminal 21 and the detecting terminal 22 in one set; and electrically connecting an end of the second conductive lead 32 to the second low voltage terminal 102, and extending another end of the second conductive lead 32 between the high voltage terminal 21 and the detecting terminal 22 in one set corresponding to the first conductive lead 31; and electrically connecting an end of the third conductive lead 33 to the third low voltage terminal 103, and extending another end of the third conductive lead 33 between the high voltage terminal 21 and the detecting terminal 22 in the other set; and electrically connecting an end of the fourth conductive lead 34 to the fourth low voltage terminal 105, and extending another end of the fourth conductive lead 34 between the high voltage terminal 21 and the detecting terminal 22 in the other set corresponding to the third conductive lead 33.

In an embodiment, the method can further include: arranging the first conductive lead 31 in T-shape or L-shape; and/or arranging the second conductive lead 32 in T-shape or L-shape.

In an embodiment, the method can further include:

separating the first conductive lead 31 and the second conductive lead 32 which are located between the high voltage terminal 21 and the detecting terminal 22 from each other; and disposing the first conductive lead 31 near the detecting terminal 22 relative to the second conductive lead 32, or disposing the second conductive lead 32 near the detecting terminal 22 relative to the first conductive lead 31.

In an embodiment, the first low voltage terminal 101 can include any one of the enable terminal 101*a*, the clock terminal 101*b*, the ground terminal 101*c*, the data terminal 101*d*, or the power terminal 101*e*; and/or the second low voltage terminal 102 can also include any one of the enable terminal 101*a*, the clock terminal 101*b*, the ground terminal 101*c*, the data terminal 101*d*, or the power terminal 101*e*.

In an embodiment, the first low voltage terminal 101 can include the ground terminal 101*c*, and the second low voltage terminal 102 can include any one of the enable terminal 101*a*, the clock terminal 101*b*, the data terminal 101*d* or the power terminal 101*e*.

In an embodiment, the method can further include:

providing the first groove 11 at the substrate 10, disposing the first conductive layer in the first groove 11, and the first conductive layer being defined as at least one of the ground terminal 101*c*, the data terminal 101*d*, and the power terminal 101*e*; and/or arranging the ground terminal 101*c*, the data terminal 101*d* and the power terminal 101*e* side by side.

In an embodiment, the method can further include:

providing the second groove 12 at the second side wall of the substrate 10, the second groove 12 including a plurality of second slot walls, disposing the second conductive layer on at least one of the second slot wall of the second groove 12, and the second conductive layer being defined as the high voltage terminal 21; or providing the third groove 13 at the third side wall of the substrate 10, disposing the third conductive layer in the third groove 13, and the third conductive layer being defined as the detecting terminal 22.

The manufacturing method of the consumable chip provided in the present disclosure corresponds to the above consumable chip, and the technical features and its beneficial effects described in the embodiments of the above consumable chip are applicable to the embodiments of the manufacturing method of the consumable chip. The steps of the manufacturing method of the consumable chip can be combined in any order, and no sequence is required.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

An ordinary person skilled in the art should realize that the above-described embodiments are merely illustrative of several embodiments of the present disclosure, but is not to be construed as limiting the scope of the disclosure. It should be noted that a number of variations and modifications may be made by those skilled in the art without departing from the spirit and scope of the disclosure.

We claim:

1. A consumable chip, comprising a memory, a substrate, at least one low voltage terminal electrically connected to the memory, at least one high voltage terminal, and at least one detecting terminal; the at least one low voltage terminal, the at least one high voltage terminal, and the at least one detecting terminal being disposed on the substrate, and the at least one high voltage terminal and the at least one detecting terminal being separated from each other, wherein the consumable chip further comprises a conductive structure, an end of the conductive structure is electrically connected to the at least one low voltage terminal, and another end of the conductive structure extends between the at least one high voltage terminal and the at least one detecting terminal; and the substrate comprises at least one of the following structures:

the substrate is provided with a first groove at a first side wall, and a first conductive layer is disposed in the first groove and defined as the at least one low voltage terminal;

the substrate is provided with a second groove at a second side wall, and a second conductive layer is disposed in the second groove and defined as the at least one high voltage terminal; or the substrate is provided with a third groove and a fourth groove at a third side wall, the fourth groove is along a length direction of the substrate, the third groove is disposed on a side wall of the fourth groove, and a third conductive layer is disposed in the third groove and defined as the at least one detecting terminal.

2. The consumable chip of claim 1, wherein the consumable chip comprises two sets of the high voltage terminal and the detecting terminal, the two sets are separated from each other, the at least one low voltage terminal is connected to at least one conductive structure, an end of the at least one conductive structure is electrically connected to the at least one low voltage terminal, and another end of the at least one conductive structure extends between the high voltage terminal and the detecting terminal in at least one same set.

3. The consumable chip of claim 2, wherein at least two conductive structures are disposed between the high voltage terminal and the detecting terminal in each same set; or one conductive structure is disposed between the high voltage terminal and the detecting terminal in one set, and at least two conductive structures are disposed between the high voltage terminal and the detecting terminal in the other set.

4. The consumable chip of claim 1, wherein the conductive structure comprises a metal wire.

5. The consumable chip of claim 1, wherein the conductive structure is in a shape of T or L.

6. The consumable chip of claim 1, wherein the second groove is a right-angle groove which has a long side wall and a short side wall, and the second conductive layer is disposed on the long side wall and defined as the at least one high voltage terminal.

7. The consumable chip of claim 1, wherein the conductive structure comprises a connecting section and a barrier section, an end of the connecting section is electrically connected to the at least one low voltage terminal, another end of the connecting section is electrically connected to the barrier section, and the barrier section extends between the at least one high voltage terminal and the at least one detecting terminal.

8. A consumable cartridge, comprising a consumable cartridge body and the consumable chip of claim 1, wherein the consumable chip is disposed on the consumable cartridge body.

9. The consumable cartridge of claim 8, wherein the consumable chip comprises two sets of the high voltage terminal and the detecting terminal, the two sets are separated from each other, the at least one low voltage terminal is connected to at least one conductive structure, an end of the at least one conductive structure is electrically connected to the at least one low voltage terminal, and another end of the at least one conductive structure extends between the high voltage terminal and the detecting terminal in at least one same set.

10. The consumable cartridge of claim 9, wherein at least two conductive structures are disposed between the high voltage terminal and the detecting terminal in each same set; or one conductive structure is disposed between the high voltage terminal and the detecting terminal in one set, and at least two conductive structures are disposed between the high voltage terminal and the detecting terminal in the other set.

11. The consumable cartridge of claim 8, wherein the conductive structure comprises a metal wire.

12. The consumable cartridge of claim 8, wherein the conductive structure is in a shape of T or L.

13. The consumable cartridge of claim 8, wherein the second groove is a right-angle groove which has a long side wall and a short side wall, and the second conductive layer is disposed on the long side wall and defined as the at least one high voltage terminal.

14. The consumable cartridge of claim 8, wherein the conductive structure comprises a connecting section and a barrier section, an end of the connecting section is electrically connected to the at least one low voltage terminal, another end of the connecting section is electrically connected to the barrier section, and the barrier section extends between the at least one high voltage terminal and the at least one detecting terminal.

15. A manufacturing method of a consumable chip, comprising:

disposing a memory, at least one low voltage terminal electrically connected to the memory, at least one high voltage terminal, and at least one detecting terminal on a substrate, wherein the at least one high voltage terminal and the at least one detecting terminal are separated from each other; and disposing a conductive structure on the substrate, wherein an end of the conductive structure is electrically connected to the at least one low voltage terminal, and another end of the conductive structure extends between the at least one high voltage terminal and the at least one detecting terminal, wherein the substrate comprises at least one of the following structures:

the substrate is provided with a first groove at a first side wall, and a first conductive layer is disposed in the first groove and defined as the at least one low voltage terminal;

the substrate is provided with a second groove at a second side wall, and a second conductive layer is disposed in the second groove and defined as the at least one high voltage terminal; or the substrate is provided with a third groove and a fourth groove at a third side wall, the fourth groove is along a length direction of the substrate, the third groove is disposed on a side wall of the fourth groove, and a third conductive layer is disposed in the third groove and defined as the at least one detecting terminal.

* * * * *